(12) United States Patent
Banga et al.

(10) Patent No.: US 12,288,213 B2
(45) Date of Patent: Apr. 29, 2025

(54) SYSTEMS, METHODS AND COMPUTER PROGRAM PRODUCTS FOR SECURE CONTACTLESS PAYMENT TRANSACTIONS

(71) Applicant: Mastercard International Incorporated, New York, NY (US)

(72) Inventors: Saurabh Banga, Pune (IN); Lalit Manchanda, Haryana (IN)

(73) Assignee: Mastercard International Incorporated, Purchase, NY (US)

( * ) Notice: Subject to any disclaimer, the term of this patent is extended or adjusted under 35 U.S.C. 154(b) by 194 days.

(21) Appl. No.: 17/696,676

(22) Filed: Mar. 16, 2022

(65) Prior Publication Data

US 2023/0298019 A1    Sep. 21, 2023

(51) Int. Cl.
G06Q 20/40    (2012.01)
G06Q 20/32    (2012.01)
(Continued)

(52) U.S. Cl.
CPC ....... G06Q 20/401 (2013.01); G06Q 20/3276 (2013.01); H04W 12/03 (2021.01); H04W 12/66 (2021.01)

(58) Field of Classification Search
None
See application file for complete search history.

(56) References Cited

U.S. PATENT DOCUMENTS 6,000,832 A    12/1999 Franklin
6,327,578 B1   12/2001 Linehan
(Continued)

FOREIGN PATENT DOCUMENTS

CN    101192295 A    6/2008
DE    102011085537 A1    5/2013
(Continued)

OTHER PUBLICATIONS

PCT International Search Report, Application No. PCT/GB2017/051818, dated Sep. 1, 2017, 2 pp.
(Continued)

*Primary Examiner* — Scott S Trotter
*Assistant Examiner* — Amit Patel
(74) *Attorney, Agent, or Firm* — Pramudji Law Group PLLC; Ari Pramudji

(57) ABSTRACT

The invention provides methods, systems and computer program products for implementing an electronic payment transaction between mobile communication device and a NFC enabled merchant device, both of which are configured to implement a defined communication protocol. The invention implements the required functionality by (i) receiving a request for a trust token from a merchant device, (ii) determining whether the merchant device is trustworthy, (iii) responsive to a determination that the merchant device is trustworthy, generating and transmitting a first displayable trust token to the merchant device, (iv) receiving a second displayable token from the mobile communication device, (v) comparing the received second displayable token against the first displayable token, and generating a merchant device validation message based on the comparison, and (vi) transmitting the merchant validation decision message to the mobile communication device.

18 Claims, 12 Drawing Sheets

(51) Int. Cl.
*H04W 12/03* (2021.01)
*H04W 12/60* (2021.01)

(56) References Cited

U.S. PATENT DOCUMENTS

| | | | |
|---|---|---|---|
| 6,434,238 | B1 | 8/2002 | Chaum et al. |
| 7,027,773 | B1 | 4/2006 | McMillin |
| 7,357,309 | B2 | 4/2008 | Ghosh |
| 7,657,748 | B2 | 2/2010 | Gentry |
| 8,720,771 | B2 | 5/2014 | MacKinnon |
| 9,195,984 | B1 | 11/2015 | Spector |
| 9,262,651 | B2 | 2/2016 | Paulsen |
| 9,595,030 | B2 | 3/2017 | Ekselius |
| 9,674,892 | B1 | 6/2017 | Li |
| 9,741,036 | B1 | 8/2017 | Grassadonia |
| 9,774,401 | B1 | 9/2017 | Borrill |
| 10,496,856 | B2 | 12/2019 | Palermo |
| 10,706,400 | B1 | 7/2020 | Puffer et al. |
| 10,902,423 | B2 | 1/2021 | Radu et al. |
| 10,963,871 | B2 | 3/2021 | Safak et al. |
| 11,074,564 | B2 | 7/2021 | Gurunathan et al. |
| 11,080,697 | B2 | 8/2021 | Lakka et al. |
| 11,080,713 | B2 | 8/2021 | Kohli |
| 11,093,938 | B2 | 8/2021 | Parekh |
| 11,107,078 | B2 | 8/2021 | Mariappan et al. |
| 11,157,896 | B2 | 10/2021 | Nwokolo et al. |
| 11,301,865 | B2 | 4/2022 | Tang |
| 2004/0019571 | A1 | 1/2004 | Hurwitz |
| 2006/0049258 | A1 | 3/2006 | Pikivi |
| 2006/0219776 | A1 | 10/2006 | Finn |
| 2006/0283960 | A1 | 12/2006 | Top |
| 2007/0022058 | A1 | 1/2007 | Labrou et al. |
| 2007/0125840 | A1 | 6/2007 | Law et al. |
| 2008/0048036 | A1 | 2/2008 | Matsumoto et al. |
| 2008/0071681 | A1 | 3/2008 | Khalid |
| 2009/0048971 | A1 | 2/2009 | Hathaway et al. |
| 2009/0104888 | A1 | 4/2009 | Cox |
| 2010/0033299 | A1 | 2/2010 | Davis |
| 2011/0022521 | A1 | 1/2011 | Collinge et al. |
| 2011/0178884 | A1 | 7/2011 | Teicher et al. |
| 2011/0184867 | A1 | 7/2011 | Varadarajan |
| 2011/0215159 | A1 | 9/2011 | Jain |
| 2011/0238573 | A1 | 9/2011 | Varadarajan |
| 2012/0036360 | A1 | 2/2012 | Bassu et al. |
| 2012/0084836 | A1 | 4/2012 | Mahaffey et al. |
| 2012/0116902 | A1 | 5/2012 | Cardina et al. |
| 2013/0212025 | A1 | 8/2013 | Tanner |
| 2013/0262296 | A1 | 10/2013 | Thomas et al. |
| 2013/0297508 | A1 | 11/2013 | Belamant |
| 2014/0040139 | A1 | 2/2014 | Brudnicki |
| 2014/0061302 | A1 | 3/2014 | Hammad |
| 2014/0138435 | A1 | 5/2014 | Khalid |
| 2014/0189359 | A1 | 7/2014 | Marien |
| 2014/0191031 | A1 | 7/2014 | Paulsen |
| 2014/0258135 | A1 | 9/2014 | Park |
| 2014/0279556 | A1 | 9/2014 | Priebatsch et al. |
| 2014/0358777 | A1 | 12/2014 | Gueh |
| 2015/0032627 | A1 | 1/2015 | Dill et al. |
| 2015/0032636 | A1 | 1/2015 | Wedekind |
| 2015/0046339 | A1 | 2/2015 | Wong |
| 2015/0112870 | A1 | 4/2015 | Nagasundaram et al. |
| 2015/0137949 | A1 | 5/2015 | Rofougaran et al. |
| 2015/0142673 | A1 | 5/2015 | Nelsen et al. |
| 2015/0262180 | A1 | 9/2015 | Hambleton |
| 2015/0269566 | A1 | 9/2015 | Gaddam et al. |
| 2015/0294305 | A1 | 10/2015 | Wang |
| 2015/0302390 | A1 | 10/2015 | Huxham et al. |
| 2015/0310425 | A1 | 10/2015 | Cacioppo |
| 2016/0065370 | A1 | 3/2016 | Le Saint |
| 2016/0071095 | A1 | 3/2016 | Foerster et al. |
| 2016/0117715 | A1 | 4/2016 | Gross et al. |
| 2016/0217467 | A1 | 7/2016 | Smets et al. |
| 2016/0224971 | A1 | 8/2016 | Aabye |
| 2016/0307186 | A1 | 10/2016 | Noe |
| 2017/0091758 | A1 | 3/2017 | Kim et al. |
| 2017/0178090 | A1 | 6/2017 | Sarin |
| 2017/0330181 | A1 | 11/2017 | Ortiz |
| 2017/0330184 | A1 | 11/2017 | Sabt |
| 2017/0344974 | A1 | 11/2017 | Britt |
| 2018/0005231 | A1 | 1/2018 | Grassadonia et al. |
| 2018/0047016 | A1 | 2/2018 | Sarin |
| 2018/0232734 | A1 | 8/2018 | Smets et al. |
| 2018/0349907 | A1 | 12/2018 | Dixon |
| 2019/0026716 | A1 | 1/2019 | Anbukkarasu |
| 2019/0034929 | A1 | 1/2019 | Tang et al. |
| 2019/0066097 | A1 | 2/2019 | Mackie |
| 2019/0108462 | A1 | 4/2019 | Deloo |
| 2019/0075094 | A1 | 5/2019 | Clarke |
| 2019/0147449 | A1 | 5/2019 | Cole |
| 2019/0188696 | A1 | 6/2019 | Carpenter et al. |
| 2019/0205575 | A1 | 7/2019 | Gardiner et al. |
| 2019/0213585 | A1 | 7/2019 | Patni |
| 2019/0228408 | A1 | 7/2019 | Sing |
| 2019/0253434 | A1 | 8/2019 | Biyani et al. |
| 2019/0318345 | A1 | 10/2019 | Kallugudde |
| 2019/0362339 | A1 | 11/2019 | Gurunathan et al. |
| 2019/0392411 | A1 | 12/2019 | Jain et al. |
| 2020/0009454 | A1 | 1/2020 | Kaiho et al. |
| 2020/0019961 | A1 | 1/2020 | Silvestre |
| 2020/0027086 | A1 | 1/2020 | Rao et al. |
| 2020/0160325 | A1 | 5/2020 | Kim et al. |
| 2020/0219090 | A1 | 7/2020 | Zarakas et al. |
| 2020/0265420 | A1 | 8/2020 | Hamdan et al. |
| 2020/0302441 | A1 | 9/2020 | Collinge et al. |
| 2020/0410483 | A1 | 12/2020 | Dill et al. |
| 2021/0012322 | A1 | 1/2021 | Manchanda |
| 2021/0065156 | A1 | 3/2021 | Kadiwala et al. |
| 2021/0217005 | A1 | 7/2021 | Mehrhoff et al. |
| 2021/0287211 | A1 | 9/2021 | Aabye et al. |
| 2022/0051231 | A1* | 2/2022 | Laracey ............ G06Q 20/3678 |
| 2022/0122081 | A1 | 4/2022 | Wagner et al. |

FOREIGN PATENT DOCUMENTS

| | | |
|---|---|---|
| EP | 0919945 A2 | 6/1999 |
| EP | 2189934 A2 | 5/2010 |
| EP | 2390817 A | 11/2011 |
| EP | 3618403 A1 | 3/2020 |
| JP | 2008129890 A | 6/2008 |
| JP | 2008-204248 A | 9/2008 |
| KR | 101236544 B1 | 3/2013 |
| KR | 10-2014-0008668 A | 1/2014 |
| KR | 101502460 B1 | 3/2015 |
| KR | 101679783 B1 | 11/2016 |
| KR | 2016-0140216 A | 12/2016 |
| KR | 20170058903 A | 5/2017 |
| WO | 1997046964 A1 | 12/1997 |
| WO | 2001-099070 A2 | 12/2001 |
| WO | 2003-038719 A1 | 5/2003 |
| WO | 2008-059465 A2 | 5/2008 |
| WO | 2010-070539 A1 | 6/2010 |
| WO | 2010-099352 A1 | 9/2010 |
| WO | 2010-133096 A1 | 11/2010 |
| WO | 2013-050296 A1 | 4/2013 |
| WO | 2013155627 A1 | 10/2013 |
| WO | 2016-123309 A1 | 8/2016 |
| WO | 2016-161000 A1 | 10/2016 |
| WO | 2017007935 A1 | 1/2017 |
| WO | 2018-031856 A1 | 2/2018 |
| WO | 2019-136044 A1 | 7/2019 |
| WO | 2019-161003 A1 | 8/2019 |
| WO | 2020-243286 A | 12/2020 |

OTHER PUBLICATIONS

EP Communication pursuant to Article 94 (3) EPC; 19184252.5, Aug. 25, 2022, pp. 1-7.
EP 19187159.9 European Summons to attend oral proceedings pursuant to Rule 115 (1) dated Jul. 29, 2022, pp. 1-10.
PCT International Search Report and Written Opinion; PCT/US2020-039521; Oct. 14, 2020.
EPO Office Action; EP 19187159.9; Jun. 8, 2021.
EPO Search Report; EP 19187159.9; Apr. 17, 2020.

(56) References Cited

OTHER PUBLICATIONS

Yingjiu, et al.; A Security-Enhanced One-Time Payment Scheme for Credit Card; 14th International Workshop on Research Issues on Data Engineering; Web Services for E-Commerce and E-Government Applications (RIDE'04); IEEE; 2004.

EMV MasterCard Contactless Transaction Flow, EMV Level 2 Kernels, https://www.level2kernel.com/emv-mastercard-contactless-transaction.html, 2021, pp. 1-3.

EMV Overview—Elavon Developer Portal, https://developer.elavon.com/na/docs/viaconex/1.0.0/emv-integration-guide/3_emv_overview, 2022, pp. 1-33.

EMV, https://en.wikipedia.org/wiki/EMV, Wikipedia, Jan. 18, 2022 (last edited), pp. 1-26.

Tokenization (data security), https://en.wikipedia.org/wiki/Tokenization_(data_security), Wikipedia, Jan. 8, 2022 (last edited), pp. 1-8.

EMV Integrated Circuit Card Specifications for Payment Systems, Book 4 Cardholder, Attendant, and Acquirer Interface Requirements, Nov. 2011, pp. 1-154, EMC Version 4.3 Book 4.

A Guide to EMV Chip Technology, Nov. 2014, pp. 1-36, Version 2.0, EMVCo, LLC.

Field 55: ICC Data, Elavon Developer Portal, https://developer-eu.elavon.com/docs/eisop/field-descriptions/field-55-icc-data, 2021, pp. 1-11.

Terminal verification results, https://en.wikipedia.org/wiki/Terminal_verification_results, Wikipedia, Dec. 12, 2021 (last edited), pp. 1-3.

Smart card application protocol data unit, https://en.wikipedia.org/wiki/Smart_card_application_protocol_data_unit, Wikipedia, Aug. 24, 2021 (last edited), pp. 1-3.

O. Ogundele, et al.; "The Implementation of a Full EMV Smartcard for a Point-of-Sale Transaction," World Congress on Internet Security (WorldCIS-2012), Guelph, ON, Canada, 2012, pp. 28-35.

EMVco Payment Account Reference (Par): A Primer, Version 1.1, Secure Technology Alliance, Apr. 30, 2018, pp. 1-20.

PCT/SG2022/050327 Search Report and Written Opinion dated Dec. 23, 2022, pp. 1-20.

PCT/US2022/049771 International Search Report and Written Opinion dated Mar. 20, 2023, pp. 1-19.

PCT/US2020/0402061 International Search Report and Written Opinion dated Oct. 21, 2020.

PCT/US2021/018344 International Search Report and Written Opinion dated May 27, 2021, pp. 1-11.

EP 20159634.3 Extended European Search Report dated Jul. 30, 2020, pp. 1-8.

PCT/US2021/042321 International Search Report and Written Opinion dated Nov. 11, 2021, pp. 1-11.

GB 2012833.6 Search Report dated Jan. 27, 2021, pp. 1-2.

PCT International Search Report and Written Opinion; PCT/US2021/047077; Dec. 14, 2021.

EP Search Report; EP 21858781.4; Jul. 12, 2024.

SG10202204968V Written Opinion dated Jan. 23, 2025, pp. 1-26.

\* cited by examiner

SYSTEMS, METHODS AND COMPUTER PROGRAM PRODUCTS FOR SECURE CONTACTLESS PAYMENT TRANSACTIONS

FIELD OF THE INVENTION

The present invention relates to the domain of electronic payment transactions, and more particularly to systems, methods and computer program products for enabling contactless payment transactions to be securely implemented between a payment application on a mobile communication device and a merchant device.

BACKGROUND OF THE INVENTION

Conventionally, the most common form of electronic payments has been the use of magnetic stripe based payment cards. In transactions involving magnetic stripe based payment cards, the purchaser or the merchant swipes the magnetic stripe of the payment card through a magnetic stripe reader that is coupled with or integrated within a point-of-sale (POS) terminal. The magnetic stripe contains payment account information and other security and identification information that is captured in the swiping process—and which is used for implementing the electronic payment transaction.

In the recent past, electronic payments at merchant devices have been transitioning from magnetic stripe based payment transactions to contactless or near-field-communication (NFC) based transactions. Both of the payment cards and the corresponding merchant devices (for example, point-of-sale terminals (POS terminals)) are provided with contactless or NFC based communication capabilities, wherein the payment account information and other security and identification information (that is conventionally captured in the magnetic stripe swiping process) is now communicated from the payment card to the corresponding merchant device over the contactless communication interface.

Yet more recently, contactless payments have migrated from implementation between a NFC enabled payment card and a merchant device, to implementation between a NFC enabled mobile communication device and an NFC enabled merchant device. The NFC enabled mobile communication device may have a payment application or wallet application implemented thereon—which application stores or permits input of the payment account information and other security and identification information associated with a payment card or with a payment account. When the mobile communication device interfaces with a merchant terminal over an NFC enabled communication interface, the payment application or wallet application transfers the payment account information and other security and identification information associated with the payment card to the merchant device, for implementing a payment transaction.

FIG. 1 illustrates a system environment 100 of a type that may be used for implementing NFC based payment transactions at a merchant device. In system environment 100, a NFC enabled payor device 102 (such as a NFC enabled mobile communication device or a NFC enabled payment card) interfaces with a corresponding NFC enabled merchant device 104 (for example, a computing device, card reader device, mobile communication device, cash register device etc.), and a payment transaction is initiated based on payment account information retrieved by the merchant device 104 from the payor device 102 over the NFC enabled communication interface.

FIG. 2 illustrates an exemplary mobile communication device 200, of a type that may be used as payor device 102 within system environment 100. Mobile communication device 200 comprises a contactless interface 202, a power source 204, a wallet application 206, a processor 208, a memory 210 and a NFC antenna 212.

Returning to FIG. 1, the payment card information received by merchant device 104 from the NFC enabled payor device 102 may include at least a payment card number or payment account number. Merchant device 104 transmits the payment card number/payment account number, a payee account identifier, and a payment amount through network 106 to an acquirer network 108 (i.e. a data network maintained by an acquirer institution with which the payee account is maintained). Acquirer network 108 in turn transmits the payment instruction to issuer network 110 (i.e. a data network maintained by an issuer institution which has issued a payment account to the corresponding customer/payor) through payment network 112 (i.e. a data network maintained by an intermediary between the payee's acquirer and the payor's issuer—for example, Mastercard® or Visa®). Subject to successful authorization of the payment account, the requested payment is authorized and the payment amount is transferred from a payment account associated with payor device 102 to the payee account. Confirmation of successful transaction completion may thereafter be transmitted back to the merchant device 104, and optionally, onward to the NFC enabled payor device 102.

Merchants too are progressively moving towards commercial-off-the-shelf devices for use a merchant device for accepting electronic payments. In certain instances, the merchant device 104 may comprise a mobile communication device (for example, a mobile communication device 200 of the kind illustrated in FIG. 2) having a billing application or a wallet application implemented thereon. Unlike earlier, where the merchant device 104 was typically a card reader device issued by an acquirer bank or a payment network (and was therefore inherently trustworthy), commercial-off-the-shelf merchant devices may or may not be secure and trustworthy. There is an increasingly felt need for ascertaining the reliability or trustworthiness of the merchant device 104 prior to transmitting payment account information or payment account related security information from a payor device 102 to a merchant device 104, during transaction implementation.

There is accordingly a requirement for a solution that enables a payor or a payment application implemented within a payor device, to ascertain the security, reliability or trustworthiness of a merchant device, prior to transmission of payment card information or other confidential information to the merchant device in the course of a NFC enabled contactless payment transaction.

BRIEF DESCRIPTION OF THE ACCOMPANYING DRAWINGS

SUMMARY

Figure 1:
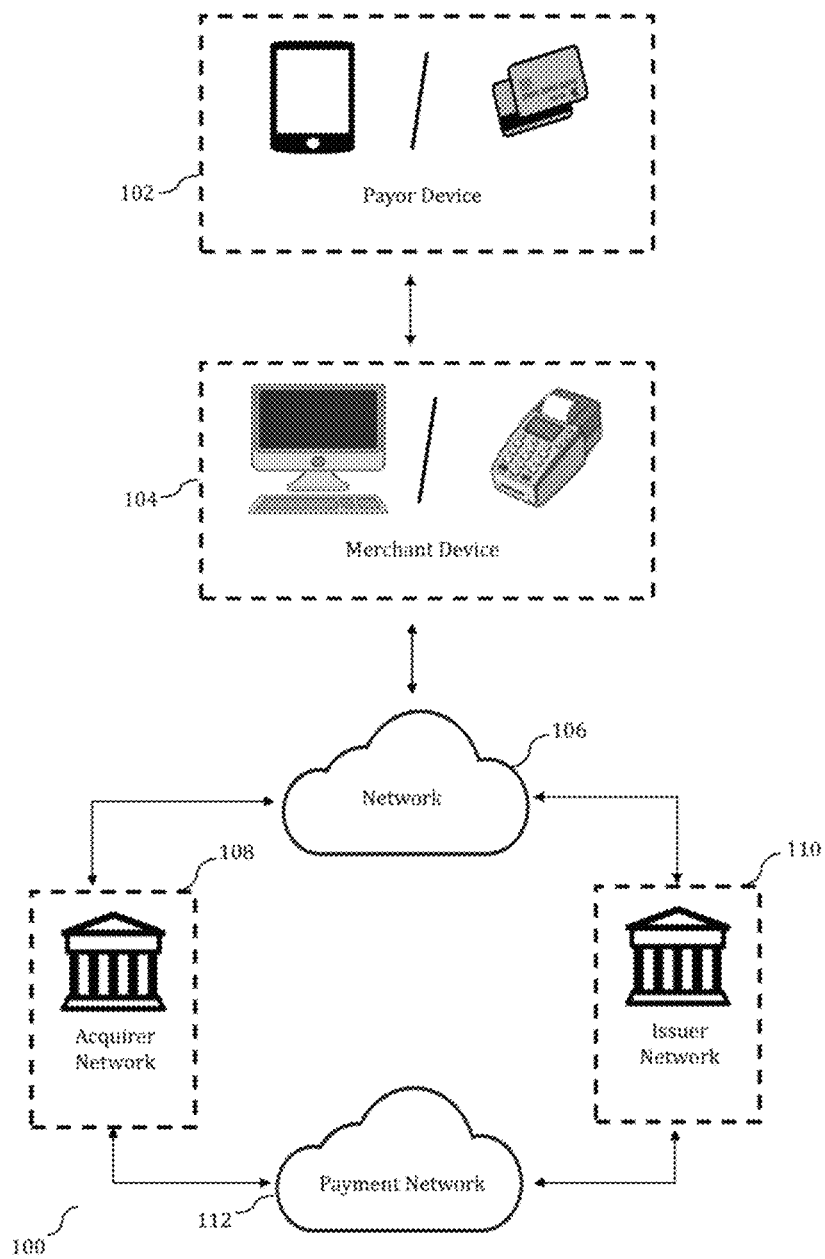
FIG. 1 illustrates a system environment for implementing a NFC enabled contactless payment transaction.

The present invention relates to the domain of electronic payment transactions, and more particularly to systems, methods and computer program products for enabling contactless payment transactions to be securely implemented between a payment application on a mobile communication device and a merchant device.

The invention provides a method for implementing an electronic payment transaction between a mobile communication device configured for implementing a defined communication protocol and a merchant device configured to implement the wireless communication protocol. The method comprises implementing within a processor implemented trust token server, the steps of (i) receiving from the merchant device a request for a trust token, (ii) determining whether the merchant device is trustworthy, wherein said determination is based on merchant device data associated with the merchant device, (iii) responsive to a determination that the merchant device is trustworthy, generating a first displayable trust token and transmitting the first displayable trust token to the merchant device, (iv) receiving a second displayable token from the mobile communication device, wherein the second displayable trust token has been imaged by the mobile communication device from a display coupled with the merchant device, (v) comparing the received second displayable token or information extracted therefrom, against the first displayable token or information extracted therefrom, and generating a merchant device validation message based on the comparison, wherein (a) the merchant device validation decision message comprises an indication that the merchant device has been validated as being trustworthy, in response to the comparison resulting in a match decision, and (b) the merchant device validation decision message comprises an indication that the merchant device has not been validated as being trustworthy, in response to the comparison resulting in a non-match decision, and (vi) transmitting the merchant validation decision message to the mobile communication device.

In an embodiment of the method, the defined communication protocol is a near-field-communication (NFC) protocol.

In another embodiment of the method, (i) responsive to the merchant device validation decision message comprising an indication that the merchant device has been validated, the mobile communication device proceeds to implement a payment transaction through contactless communication between the mobile communication device and the merchant device, and (ii) responsive to the merchant device validation decision message comprising an indication that the merchant device has not been validated, the mobile communication device terminates the contactless communication session between the mobile communication device and the merchant device prior to (a) implementing the payment transaction, or (b) transmitting payor account information to the merchant device.

The invention also provides a system for implementing an electronic payment transaction between a mobile communication device configured for implementing a defined communication protocol and a merchant device configured to implement the wireless communication protocol. The system comprises a trust token server comprising a processor and a memory, wherein the processor is configured to (i) receive from the merchant device, a request for a trust token, (ii) determine whether the merchant device is trustworthy, wherein said determination is based on merchant device data associated with the merchant device, (iii) responsive to a determination that the merchant device is trustworthy, generate a first displayable trust token and transmit the first displayable trust token to the merchant device, (iv) receive a second displayable token from the mobile communication device, wherein the second displayable trust token has been imaged by the mobile communication device from a display coupled with the merchant device, (v) compare the received second displayable token or information extracted therefrom, against the first displayable token or information extracted therefrom, and generating a merchant device validation message based on the comparison, wherein (a) the merchant device validation decision message comprises an indication that the merchant device has been validated as being trustworthy, in response to the comparison resulting in a match decision, and (b) the merchant device validation decision message comprises an indication that the merchant device has not been validated as being trustworthy, in response to the comparison resulting in a non-match decision, and (vi) transmit the merchant validation decision message to the mobile communication device.

In an embodiment, the system may be configured such that the defined communication protocol is a near-field-communication (NFC) protocol.

In another embodiment, the system may be configured so that (i) responsive to the merchant device validation decision message comprising information representing the merchant device as being validated, the mobile communication device proceeds to implement a payment transaction through contactless communication between the mobile communication device and the merchant device, and (ii) responsive to the merchant device validation decision message comprising information representing the merchant device as not being validated, the mobile communication device terminates the contactless communication session between the mobile communication device and the merchant device, prior to (a)

implementing the payment transaction, or (b) transmitting payor account information to the merchant device.

The system may be configured so that the merchant device data includes any one or more of state data, historical data, parameter data, operating system data, device data, application integrity data, and operating system reliability state data corresponding to the merchant device.

In an embodiment of the system, one or both of the first displayable trust token and the second displayable token comprise any of an optically displayable token, an optically imageable token, a pictogram, icon, image, bar code, optical code, data matrix code, or a quick-response (QR) code.

In another embodiment of the system, the first displayable trust token comprises a token that is encrypted using one or more encryption algorithms or encryption keys, for which the corresponding decryption algorithms and/or decryption keys are accessible to the trust token server, and are not accessible to either of the merchant device or the mobile communication device.

In a further system embodiment, the first displayable trust token is generated and encrypted to include a set of data parameters associated uniquely with the first displayable trust token.

In another system embodiment, (i) the first displayable trust token is associated with a defined time-to-live duration, and (ii) generation of the merchant device validation message is based on determining whether the second displayable token is received from the mobile communication device within a time-to-live duration that is associated with the first displayable trust token.

The invention additionally provides a computer program product for implementing an electronic payment transaction between a mobile communication device configured for implementing a defined communication protocol and a merchant device configured to implement the wireless communication protocol, comprising a non-transitory computer readable medium having a computer readable program code embodied therein. The computer readable program code may comprise instructions for implementing any of the method steps described in this specification.

DETAILED DESCRIPTION

The present invention provides to systems, methods and computer program products for enabling contactless payment transactions to be securely implemented between a payment application on a mobile communication device and a merchant device.

The invention achieves this through a system environment that includes a trust token server. The trust token server is configured to interface and communicate with both of a payor device and a merchant device, for the purpose of enabling the payor device to ascertain trustworthiness of the merchant device prior to transmitting payor account information or other confidential information to the merchant device.

For the purposes of the present invention, the following terms shall be understood to have the corresponding meanings provided below.

"Acquirer" shall mean a business (e.g., a financial institution or a merchant bank) that contracts with a merchant or payee to coordinate with an issuer of a payor's payment card or payment account.

"Acquirer network" shall refer to one or more servers, including hardware, software and other equipment used by an acquirer to transmit and process payment card based transactions or payment account based transactions and information related to merchants, customers, payment cards, payment accounts and/or transactions.

"Issuer" shall mean a financial institution that issues payment cards or payment accounts to users.

"Issuer network" shall refer to one or more servers, including hardware, software and other equipment used by an issuer to transmit and process payment card transactions or payment account transactions and information related to customers, payment cards, payment accounts and/or transactions.

"Payee" and "Merchant" may be used interchangeably to designate an individual or entity receiving an electronic payment.

"Payment account" shall mean any account that may be used for the purposes of effecting an electronic payment or electronic transaction, and shall include any electronic transaction account, payment card account, bank account or electronic wallet account.

"Payment card" shall mean a card or data associated with a payment account that may be provided to a merchant or payee in order to enable a financial transaction via the associated payment account. Payment cards may include credit cards, debit cards, charge cards, stored-value cards, prepaid cards, fleet cards, virtual payment numbers, virtual card numbers, controlled payment numbers, etc.

"Payment network" shall refer to any intermediary network communicatively disposed between any two or more of the merchant server, acquirer bank server and issuer bank server. In certain embodiments, the payment network may comprise a card network that enables communication between the issuer bank and the acquirer bank (for example, Mastercard® or Visa®). In such embodiments, the card network primarily coordinates payment card transactions between acquirers and issuers, and additionally coordinates clearing and settlement services to transfer payments from issuers to merchants.

"Payor", "consumer" and "customer" may be used interchangeably to designate an individual or entity making an electronic payment.

"Payor device" shall refer to an NFC enabled mobile communication device or an NFC enabled payment card.

Figure 3:
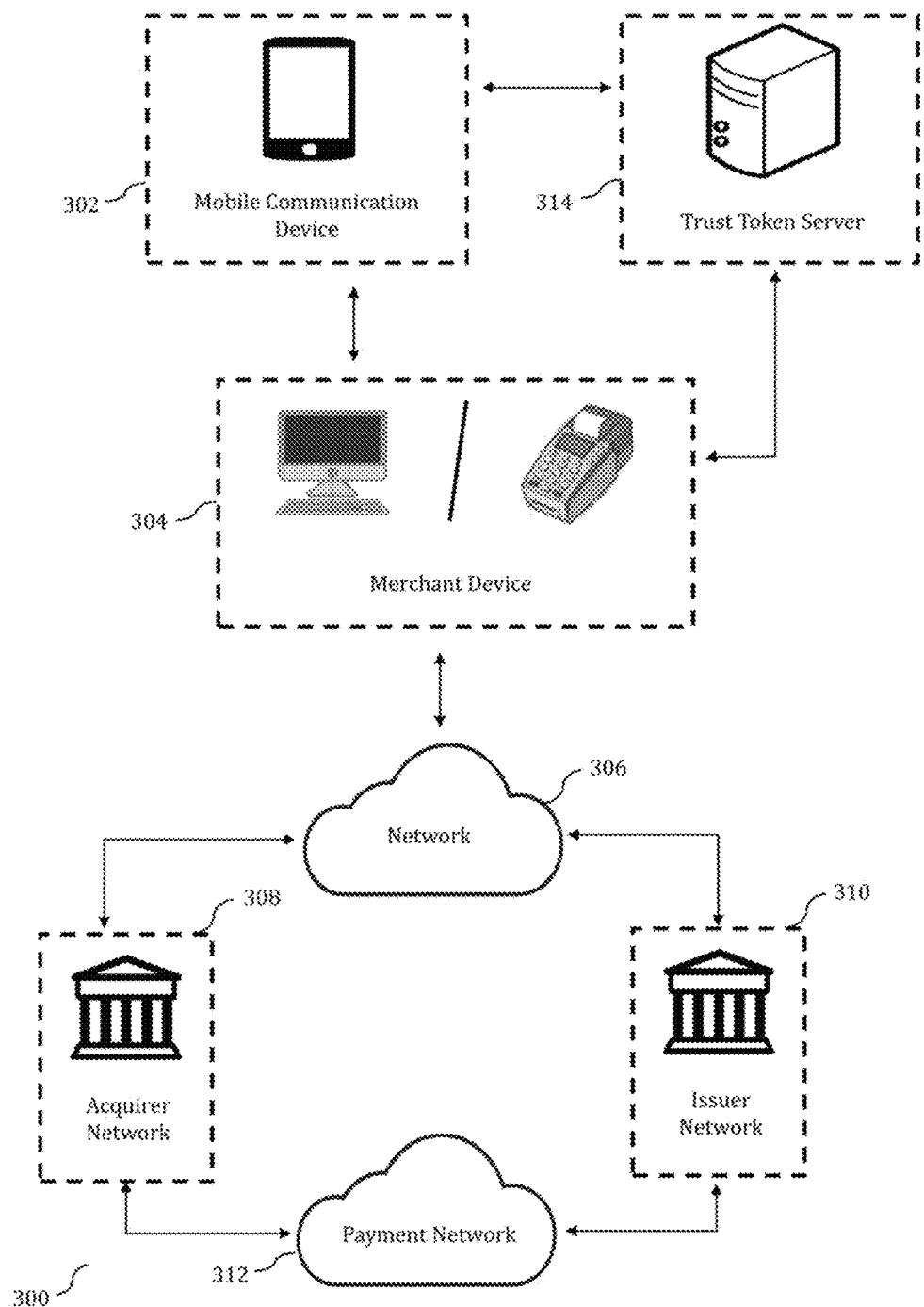
FIG. 3 illustrates a system environment for implementing a NFC enabled contactless payment transaction, configured to enable a payor or a payment application implemented within a payor device, to ascertain the trustworthiness of a merchant device, in accordance with the teachings of the present invention.

FIG. 3 illustrates a system environment 300 for implementing a NFC enabled contactless payment transaction. System environment 300 is configured to enable a payor or a payment application implemented within a payor device, to ascertain the trustworthiness of a merchant device, in accordance with the teachings of the present invention.

Figure 2:
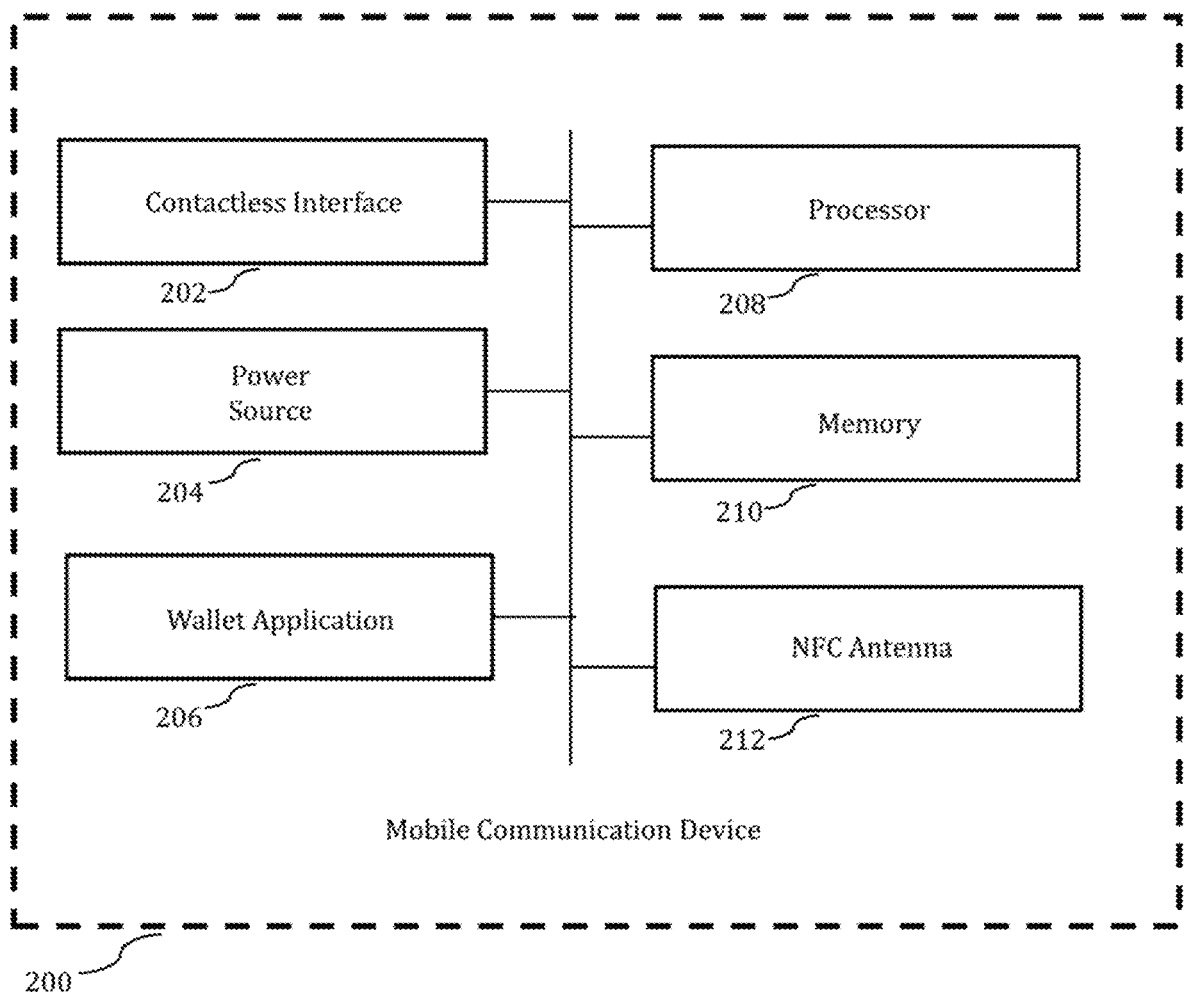
FIG. 2 illustrates an exemplary mobile communication device of a type that may be used as a payor device or as merchant device for implementing a NFC enabled contactless payment transaction.

In system environment 300, the NFC enabled payor device is a mobile communication device 302 (which may in certain embodiments have a configuration according to the mobile communication device 200 illustrated in FIG. 2). Mobile communication device 302 (or a payment application or wallet application implemented therein) may be configured to interface with a corresponding NFC enabled merchant device 304 (for example, a computing device, card reader device, mobile communication device, cash register device etc.), and to initiate a payment transaction based on payment account information transmitted to merchant device 304 from mobile communication device 302, over the NFC enabled communication interface.

System environment 300 also includes a trust token server 314 that is configured for network based communication with mobile communication device 302 and merchant device 304. Trust token server 314 is configured to enable mobile communication device 302 to ascertain trustworthiness of merchant device 304 prior to transmitting payor account information or other confidential information to merchant device 304. The configuration of trust token server 314 and the methods and communication workflows implemented by each of mobile communication device 302, merchant device 304, and trust token server 314 are discussed in more detail subsequently.

During implementation of a payment transaction, mobile communication device 302 first ascertains trustworthiness of merchant device 304 through trust token server 314. Responsive to a determination that merchant device 304 is trustworthy, mobile communication device 302 transmits to merchant device 304, a payor's payment account information and/or other confidential or security related information necessary for implementing a payment transaction through the payor's payment account.

The payment account information received by merchant device 304 from mobile communication device 302 may include at least a payment account number. Merchant device 304 thereafter transmits the payment account number, a payee account identifier, and a payment amount through network 306 to an acquirer network 308. Acquirer network 308 in turn transmits the payment instruction to issuer network 310 through payment network 312.

Subject to successful authorization of the payment account, the requested payment is authorized and the payment amount is transferred from a payment account associated with mobile communication device 302 to the payee account. Confirmation of successful transaction completion may thereafter be transmitted back to the merchant device 304, and optionally, to mobile communication device 302.

Figure 4:
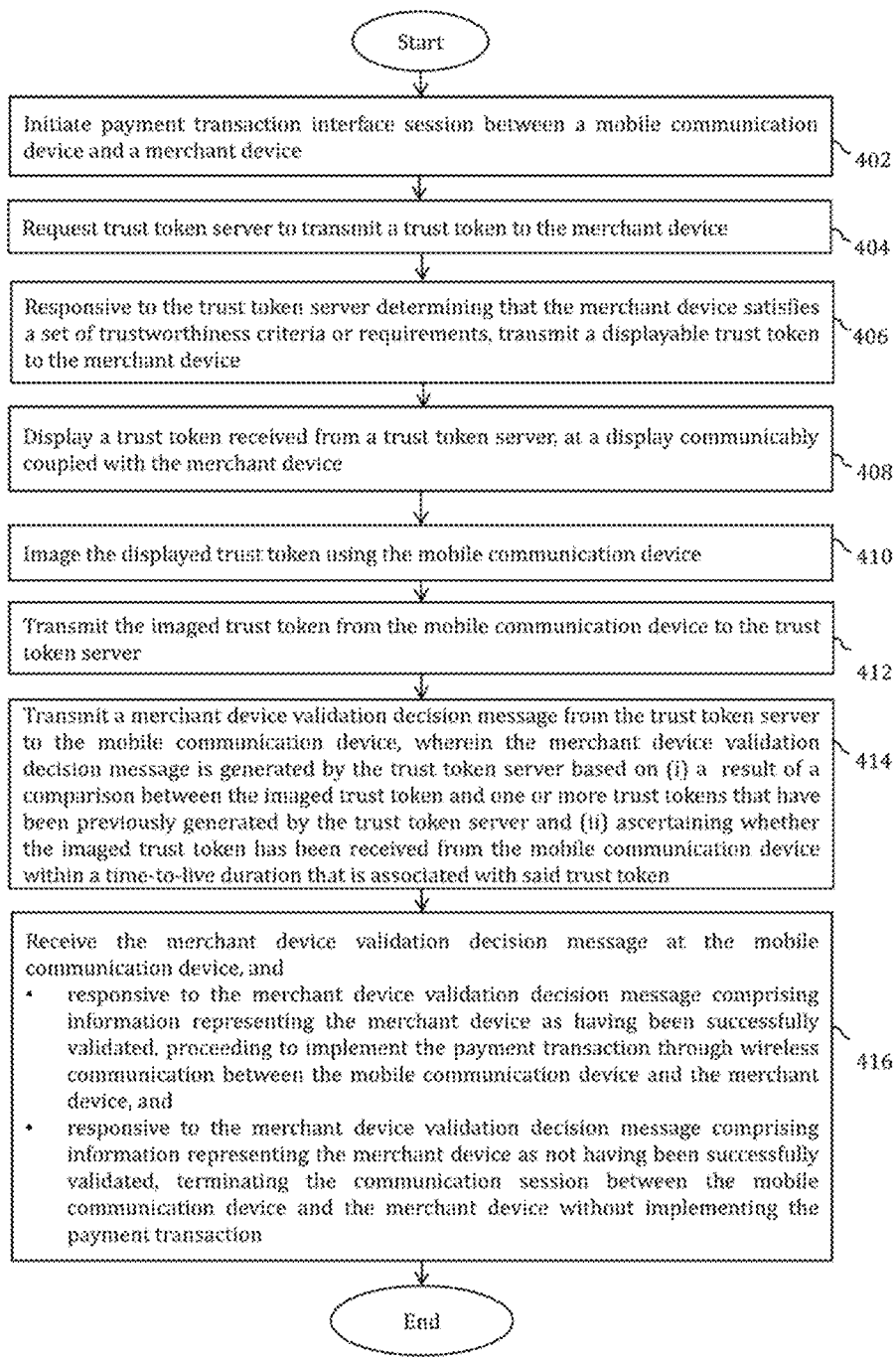
FIG. 4 is a flowchart illustrating a method of ascertaining the trustworthiness of a merchant device, in accordance with the teachings of the present invention within the system environment of FIG. 3.

FIG. 4 is a flowchart illustrating a method of ascertaining the trustworthiness of a merchant device, in accordance with the teachings of the present invention, within the system environment of FIG. 3. In an embodiment, the method of FIG. 4 may be implemented through the interaction between mobile communication device 302, merchant device 304, and trust token server 314.

The method of FIG. 4 commences at step 402—which comprises initiating a payment transaction interface session between mobile communication device 302 and merchant device 304. The payment transaction interface session may be initiated either by mobile communication device 302 or by merchant device 304, by transmitting a request or instruction to initiate a contactless communication session between mobile communication device 302 and merchant device 304. In an embodiment of the invention, the request or instruction to initiate a contactless communication session may be generated by mobile communication device 302 and transmitted to merchant device 304. In a further embodiment, the request or instruction transmitted by mobile communication device 302 to merchant device 304, may include a request for a trust token associated with merchant device 304.

Step 404 comprises requesting trust token server 314 to transmit a trust token to merchant device 304. The request for a trust token may be transmitted to trust token server 314 by merchant device 304. In an embodiment, merchant device 304 generates and transmits the request for the trust token, to trust token server 314(i) in response to initiation of a payment transaction interface session between mobile communication device 302 and merchant device 304, or (ii) in response to receiving a request for a trust token from mobile communication device 302.

In an embodiment of step 404, transmission of the request for a trust token is accompanied by transmission of merchant device data from merchant device 304 to trust token server 314. The merchant device data may include one or more of state data, historical data or parameter data corresponding to merchant device 304. Exemplary instances of merchant device data that may be transmitted from merchant device 304 to trust token server 314 includes one or more of operating system data, device data, application integrity data and/or operating system reliability state data corresponding to merchant device 304.

In an embodiment of method step 404, a software application within merchant device 304 may be configured to initiate a network communication session with trust token server 314 for the purpose of requesting and receiving a trust token from trust token server 314.

Trust token server 314 responds to the request for a trust token by implementing an assessment of the trustworthiness of merchant device 304. This assessment of trustworthiness may be implemented based on one or both of (i) the merchant device data received from merchant device 304 and (ii) a set of trustworthiness assessment criteria or trustworthiness assessment rules or trustworthiness assessment models that are accessible by trust token server 314.

Responsive to the assessment resulting in a determination (by trust token server 314) that merchant device 304 is trustworthy, step 406 comprises generating and transmitting a displayable trust token from trust token server 314 to merchant device 304. The displayable trust token may comprise any optically displayable and/or optically imageable token, including any of a pictogram, icon, image, bar code, optical code, data matrix code, and/or quick-response (QR) code.

The displayable trust token may comprise a token that is encrypted using one or more encryption algorithms and/or encryption keys, for which the corresponding decryption algorithms and/or decryption keys are accessible to trust token server 306, but not to either merchant device 304 and/or mobile communication device 302. In a further embodiment, the displayable trust token is generated and encrypted to include a set of data parameters associated uniquely with the displayable trust token-such that decryption of the displayable trust token enables extraction of said set of data parameters. In a yet further embodiment, the displayable trust token is associated with a defined time-to-live duration. The displayable trust token may also be associated with merchant device 304 or with a unique merchant device identifier or merchant identifier associated with merchant device 304. Any one or more of the data parameters associated uniquely with the displayable trust token (including any associated defined time-to-live duration and/or merchant identifier or merchant device identifier) may be stored within a database accessible by trust token server 306, along with data or one or more associations linking such parameters with the displayable trust token.

On the other hand, responsive to the assessment resulting in a determination (by trust token server 314) that merchant device 304 is not trustworthy, trust token server 314 does not generate and/or transmit a displayable trust token to merchant device 304. As a result, merchant device 304 is unable to respond satisfactorily to the request for a displayable trust token that has been received from mobile communication device 402, and the electronic payment transaction is abandoned or terminated, without sharing payor account information with merchant device 304.

Step 408 comprises displaying the trust token that has been received from trust token server 314, at a display integrated within or communicably coupled with merchant device 304. Displaying the trust token at step 408 is implemented by merchant device 304.

Step 410 comprises imaging (i.e. capturing or otherwise acquiring an image of) the trust token that has been displayed by merchant device 304 (at step 408), using mobile communication device 302. Mobile communication device 302 may include, or may have communicably coupled therewith, an imaging device such as a camera or an optical imager or an optical scanner, which enables an image of the displayed trust token to be captured or acquired by mobile communication device 302.

Step 412 comprises transmitting the imaged trust token from mobile communication device 302 to trust token server 314. In an embodiment, a software application or a wallet application implemented within mobile communication device 302 may be configured to initiate a network communication session with trust token server 314 for the purpose of implementing one or more of steps 412 to 416 of FIG. 4.

Step 414, implemented at trust token server 314, comprises generating and transmitting a merchant device validation decision message from trust token server 314 to mobile communication device 302. The merchant device validation decision message is generated based on the outcomes of (i) comparing the imaged trust token received from mobile communication device 302 with one or more trust tokens that have been previously generated by trust token server 314 and optionally (ii) ascertaining whether the imaged trust token has been received from mobile communication device 302 within a time-to-live duration that is associated with said trust token in the records of the trust token server 314.

In an embodiment, the merchant device validation decision message generated at step 414 comprises a message indicating that the merchant device 304 has been validated as being trustworthy in response to determining that (i) the imaged trust token received from mobile communication device 302 matches a displayable trust token that has been previously generated by trust token server 314 (i.e. a "match" decision) and optionally (ii) the imaged trust token has been received from mobile communication device 302 within a time-to-live duration that is associated with said displayable trust token in the records of trust token server 314.

In an embodiment, the merchant device validation decision message generated at step 414 comprises a message indicating that the merchant device 304 has not been validated as being trustworthy, in response to determining that either (i) the imaged trust token received from mobile communication device 302 does not match any displayable trust token that has been previously generated by trust token server 314 (i.e. a "non-match" decision) or (ii) the imaged trust token has been received from mobile communication device 302 outside of a time-to-live duration that is associated with said displayable trust token in the records of trust token server 314.

Step 416 comprises receiving the transmitted merchant device validation decision message at mobile communication device 302, and (i) responsive to the merchant device validation decision message comprising information representing merchant device 304 as having been successfully validated, proceeding to implement the payment transaction through contactless communication between mobile communication device 302 and merchant device 304, or (ii) alternatively, responsive to the merchant device validation decision message comprising information representing merchant device 304 as not having been successfully validated, terminating the contactless communication session between mobile communication device 302 and merchant device 304 without implementing the payment transaction.

Figure 5:
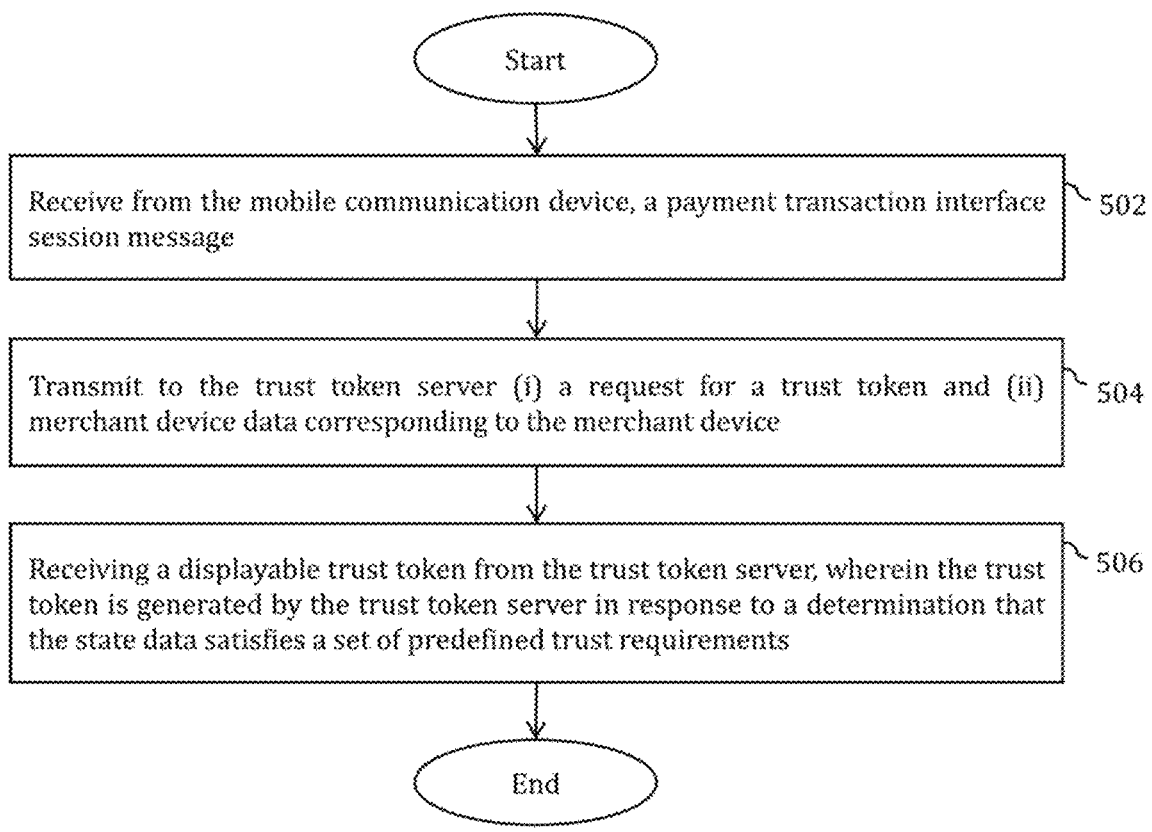
FIG. 5 illustrates method steps necessary for ascertaining the trustworthiness of a merchant device, that are implemented at the merchant device.

FIG. 5 illustrates method steps necessary for ascertaining the trustworthiness of a merchant device 304, that are implemented through merchant device 304. In an embodiment, the method steps of FIG. 5 are implemented to enable execution of one or more of steps 402 up to 408 of the method of FIG. 4.

Step 502 comprises receiving from mobile communication device 302, a payment transaction interface session message. As discussed in connection with FIG. 4, the payment transaction interface session message may comprise a request or instruction to initiate a contactless communication session for implementing an electronic payment transaction between mobile communication device 302 and merchant device 304 and/or may include a request for a trust token associated with merchant device 304.

Step 504 comprises transmitting from merchant device 304 to trust token server 314 (i) a request for a trust token and (ii) merchant device data corresponding to merchant device 304. The merchant device data may in various embodiments include one or more of state data, historical data or parameter data corresponding to merchant device 304. Exemplary instances of merchant device data that may be transmitted from merchant device 304 to trust token server 314 includes one or more of operating system data, device data, application integrity data and/or operating system reliability state data corresponding to merchant device 304.

Step 506 comprises receiving at merchant device 304 from trust token server 314, a displayable trust token from the trust token server, wherein the trust token is generated by trust token server 314 in response to a determination that the merchant device 304 is trustworthy. The determination whether the merchant device 304 is trustworthy may be made based on one or both of (i) the merchant device data received from merchant device 304 and (ii) a set of trustworthiness assessment criteria or trustworthiness assessment rules or trustworthiness assessment models that are accessible by trust token server 314.

Figure 6:
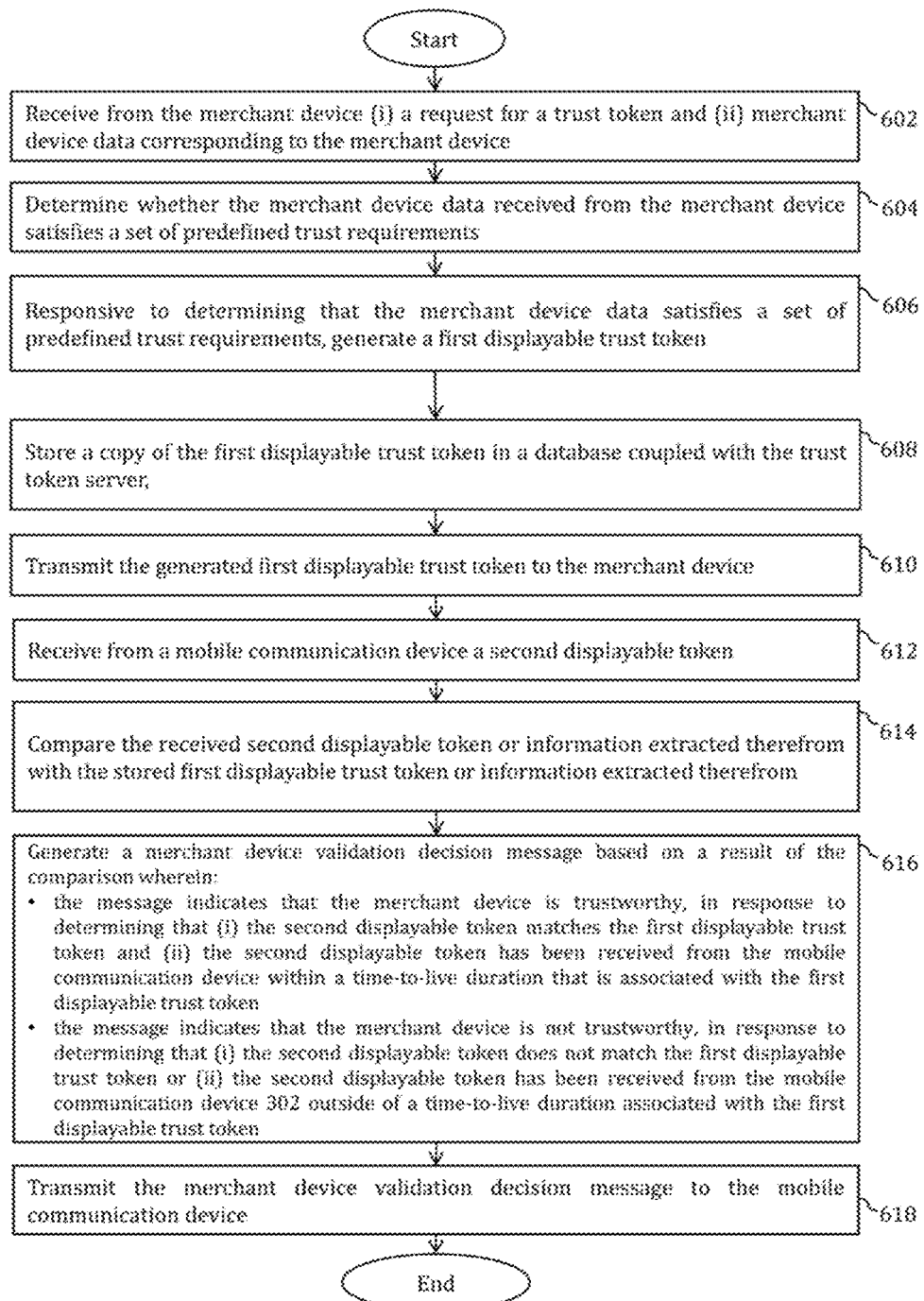
FIG. 6 illustrates method steps necessary for ascertaining the trustworthiness of a merchant device, that are implemented at a trust token server.

FIG. 6 illustrates method steps necessary for ascertaining the trustworthiness of merchant device 304, that are implemented through trust token server 314. In an embodiment, the method steps of FIG. 6 are implemented to execute any of steps 406 and 414 of the method of FIG. 4.

Step 602 comprises receiving at trust token server 314 from merchant device 304(i) a request for a trust token and (ii) merchant device data corresponding to the merchant device. The merchant device data may in various embodiments include one or more of state data, historical data or parameter data corresponding to merchant device 304. Exemplary instances of merchant device data that may be transmitted from merchant device 304 to trust token server 314 may include one or more of operating system data, device data, application integrity data and/or operating system reliability state data corresponding to merchant device 304.

Step 604 comprises determining whether the merchant device data received from merchant device 304 satisfies a set of predefined trust requirements. The predefined trust requirements used for the determination at step 604 may include one or more of a set of trustworthiness assessment criteria or trustworthiness assessment rules or trustworthiness assessment models that are accessible by trust token server 314.

Step 606 comprises responding to a determination that the merchant device data satisfies a set of predefined trust requirements, by generating at trust token server 314, a first displayable trust token. The first displayable trust token may comprise any optically displayable and/or optically imageable token, including any of a pictogram, icon, picture, bar code, optical code, data matrix code, and/or quick-response (QR) code.

The first displayable trust token may comprise a token that is encrypted using one or more encryption algorithms and/or encryption keys, for which the corresponding decryption algorithms and/or decryption keys are accessible to trust token server 306, but not to either merchant device 304 and/or mobile communication device 302. In a further embodiment, the first displayable trust token is generated and encrypted to include a set of data parameters associated uniquely with the first displayable trust token-such that decryption of the first displayable trust token enables extraction of said set of data parameters. In a yet further embodiment, the first displayable trust token is associated with a defined time-to-live duration. The first displayable trust token may also be associated with merchant device 304 or with a unique merchant device identifier or merchant identifier associated with merchant device 304.

Step 608 comprises storing a copy of the first displayable trust token in a database coupled with trust token server 314. In various embodiments, the stored copy of the first displayable trust token may be associated within the records of trust token server 314, with one or more of a set of data parameters associated uniquely with the first displayable trust token, a defined time-to-live duration associated with the first displayable trust token, and/or a unique identifier associated with merchant device 304 (for example, a unique merchant device ID or a unique merchant ID).

Step 610 comprises transmitting the generated first displayable trust token from trust token server 314 to merchant device 304. The generated first displayable trust token may be transmitted to merchant device 304 over a communication network. The generated first displayable trust token may thereafter be displayed on a display by merchant device 304 (in accordance with step 404 of FIG. 4).

At step 612, trust token server 314 receives from mobile communication device 302, a second displayable token. The second displayable token may comprise any optically displayable and/or optically imageable token, including any of a pictogram, icon, picture, bar code, optical code, data matrix code, and/or quick-response (QR) code. In an embodiment, the second displayable token received from mobile communication device 302 is an image of the first displayable trust token (i) that has been displayed on a display by merchant device 304 (in accordance with step 404 of FIG. 4), (ii) which has been imaged by an imaging device (such as a camera or scanner) within mobile communication device 304 (in accordance with step 406 of FIG. 4), and (iii) which has been transmitted from mobile communication device 302 to trust token server 314 (in accordance with step 408 of FIG. 4).

Step 614 comprises comparing the received second displayable token or information extracted therefrom, with the stored first displayable trust token or information extracted therefrom. In an embodiment, step 614 may comprise comparing the received second displayable token or information extracted therefrom against all valid (or live) displayable trust tokens (or information extracted therefrom) that are stored within a database accessible by trust token server 314. In the process of comparing against all valid (or live) displayable trust tokens stored within a database, trust token server 314 will necessarily compare the received second displayable token (or information extracted therefrom) against the stored first displayable trust token (or information extracted therefrom) as well.

In an embodiment of the invention, the comparison at step 614 may be preceded by the step of decrypting one or both of the first displayable trust token, and the second displayable token based on one or more decryption algorithms or encryption or decryption keys stored with trust token server 314. In an embodiment the one or more decryption algorithms or encryption or decryption keys used for decryption are not accessible by and are not shared with either of merchant device 304 or mobile communication device 302.

Step 616 comprises generating a merchant device validation decision message based on a result of the comparison at step 614. The merchant device validation decision message at step 616 may be generated based on the outcomes of (i) comparing the second displayable token received from mobile communication device 302 with the first displayable trust token (or a comparison of the respective information therewithin), and (ii) ascertaining whether the second displayable token has been received from mobile communication device 302 within a time-to-live duration that is associated with the first displayable trust token in the records of trust token server 314.

In an embodiment, the merchant device validation decision message generated at step 614 comprises a message indicating that the merchant device 304 has been validated as being trustworthy, in response to determining that (i) the second displayable token received from mobile communication device 302 matches the first displayable trust token that is stored in the records of trust token server 314 (i.e. a "match" decision) and (ii) the second displayable token has been received from mobile communication device 302 within a time-to-live duration that is associated with the first displayable trust token in the records of trust token server 314.

In an embodiment, the merchant device validation decision message generated at step 616 comprises a message indicating that the merchant device 304 has not been validated as being trustworthy, in response to determining that either (i) the second displayable token received from mobile communication device 302 does not match the first displayable trust token (i.e. a "non-match" decision) or (ii) the second displayable token has been received from mobile communication device 302 outside of a time-to-live duration that is associated with the first displayable trust token in the records of trust token server 314.

Step 618 comprises transmitting the merchant device validation decision message to mobile communication device 302. As discussed in connection with step 416 of FIG. 4, mobile communication device 302 may be configured to (i) respond to the merchant device validation decision message comprising information representing merchant device 304 as having been successfully validated, by proceeding to implement the payment transaction through contactless communication between mobile communication device 302 and merchant device 304, and/or (ii) respond to the merchant device validation decision message comprising information representing merchant device 304 as not having been successfully validated, by terminating the contactless communication session between mobile communication device 302 and merchant device 304 without implementing the payment transaction.

Figure 7:
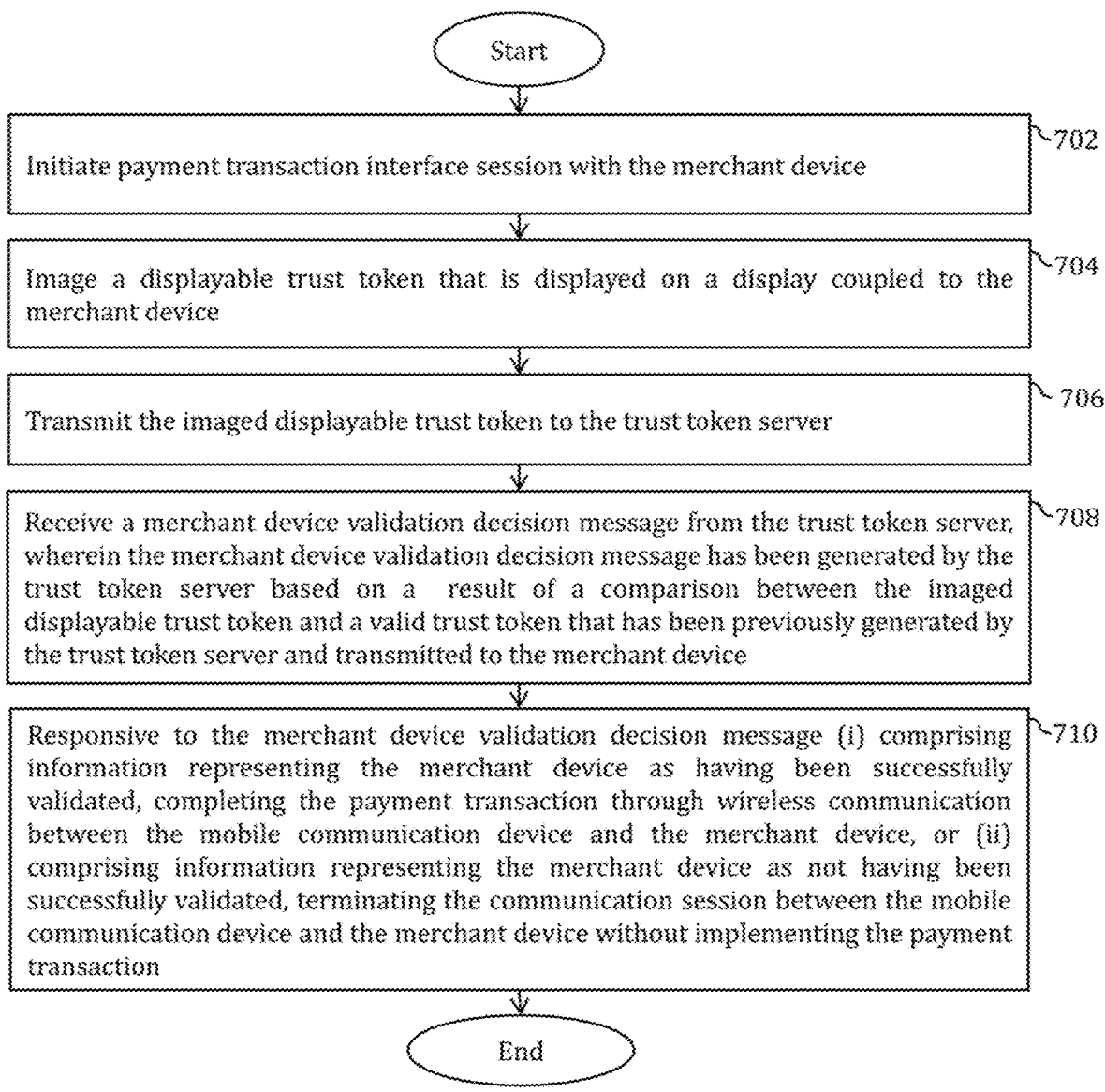
FIG. 7 illustrates method steps necessary for ascertaining the trustworthiness of a merchant device, that are implemented at a payor device.

FIG. 7 illustrates method steps necessary for ascertaining the trustworthiness of a merchant device, that are implemented through a payor device such as a mobile communication device 302. In an embodiment, the method steps of FIG. 7 are implemented to enable implementation of steps 402, 410, 412 and/or 416 of the method of FIG. 4.

Step 702 comprises initiating a payment transaction interface session with merchant device 304. In the illustrated embodiment, the payment transaction interface session is initiated by mobile communication device 302, and comprises transmission of a request or instruction to initiate a contactless communication session for implementing an electronic payment transaction between mobile communication device 302 and merchant device 304. The request or instruction transmitted by mobile communication device 302 to merchant device 304, may include a request for a trust token associated with merchant device 304.

Step 704 comprises imaging a displayable trust token that is displayed on a display coupled to merchant device 304. The displayable trust token may in an embodiment comprise a trust token that has been generated by trust token server 314 and transmitted to merchant device 304 in response to a determination that merchant device 304 is trustworthy. Step 704 may be implemented by capturing or otherwise acquiring an image of the displayable trust token that has been displayed by merchant device 304. Mobile communication device 302 may include, or may have communicably coupled therewith, an imaging device such as a camera or an optical imager or an optical scanner, which enables an image of the displayed trust token to be captured or acquired by mobile communication device 302.

Step 706 comprises transmitting the imaged displayable trust token from mobile communication device 302 to trust token server 314. The displayable trust token may be transmitted to trust token server 314 over a communication network.

Step 708 comprises receiving at mobile communication device 302, from trust token server 314, a merchant device validation decision message. The merchant device validation decision message is generated by trust token server 314 based on a result of a comparison between the imaged displayable trust token and a valid displayable trust token that has been previously generated by trust token server 314 and transmitted to merchant device 302.

In an embodiment, the merchant device validation decision message received at step 708 comprises a message indicating that merchant device 304 has been validated as being trustworthy, in response to determining that (i) the imaged displayable trust token received from mobile communication device 302 matches a displayable trust token that has been previously generated by trust token server 314 (i.e. a "match" decision) and (ii) the imaged trust token has been received from mobile communication device 302 within a time-to-live duration that is associated with said displayable trust token in the records of trust token server 314.

In an embodiment, the merchant device validation decision message received at step 708 comprises a message indicating that merchant device 304 has not been validated as being trustworthy, in response to determining that either (i) the imaged displayable trust token received from mobile communication device 302 does not match any displayable trust token that has been previously generated by trust token server 314 (i.e. a "non-match" decision) or (ii) the imaged displayable trust token has been received from mobile communication device 302 outside of a time-to-live duration that is associated with said displayable trust token in the records of trust token server 314.

At step 710, responsive to the merchant device validation decision message (i) comprising information representing the merchant device 304 as having been successfully validated, mobile communication device 302 proceeds to complete the payment transaction through wireless communication/NFC communication between mobile communication device 302 and merchant device 304, or (ii) comprising information representing merchant device 304 as not having been successfully validated, terminating the communication session between mobile communication device 302 and merchant device 304 without implementing the payment transaction or without transmitting payor aaccount information to merchant device 304.

Figure 8:
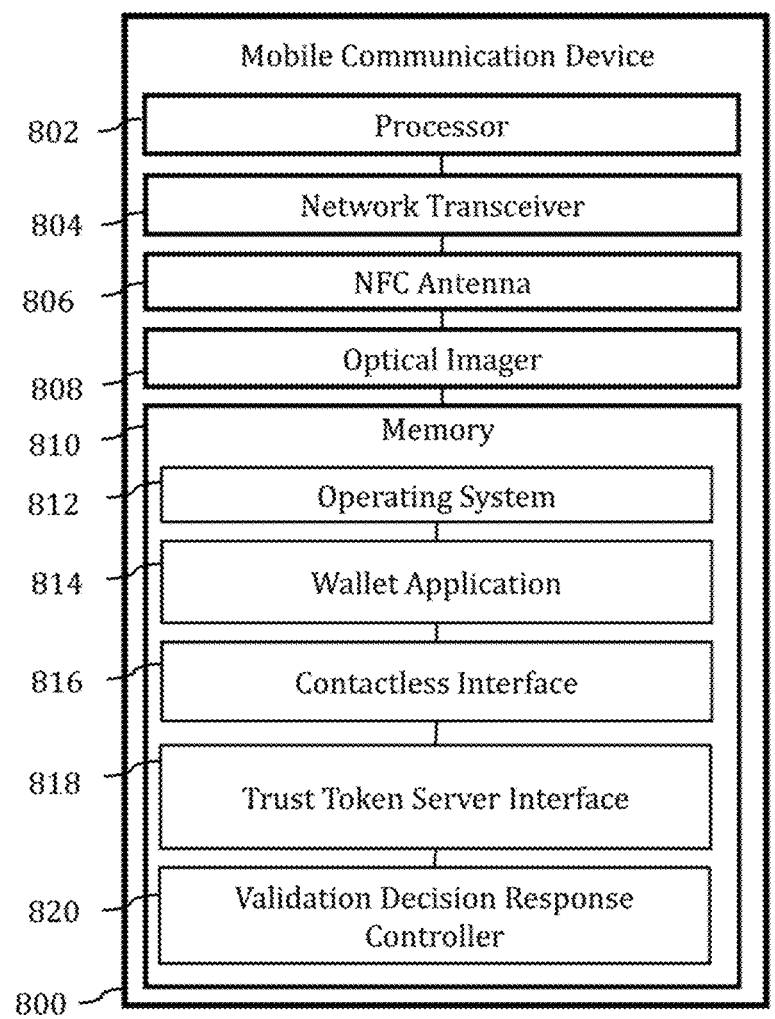
FIG. 8 illustrates an exemplary mobile communication device of a type that may be configured as a payor device to implement the methods of the present invention.

FIG. 8 illustrates an exemplary mobile communication device 800 of a type that may be configured as a payor device to implement the methods of the present invention (for example, to implement the functionality of mobile communication device 302 as described above).

As shown in FIG. 8, mobile communication device 800 includes (i) a processor 802, (ii) a network transceiver 804 configured to enable transmission and receiving of network communications, (iii) a near field communication (NFC) antenna 806 configured to send and receive near-field-communication based data messages, (iv) an optical imager 808 (for example, a camera or optical scanner) configured to enable mobile communication device 800 to capture or acquire images, including images of displayable trust tokens, and (v) a memory 810.

In an exemplary embodiment, memory 810 may have stored therewithin, one or more of (i) an operating system 812 configured for managing device hardware and software resources and that provides common services for software programs implemented within mobile communication device 800, (ii) a wallet application 814 configured for implementing electronic payment transactions through mobile communication device 800, (iii) a contactless interface 816 configured to implement contactless communication sessions between mobile communication device 800 and one or more other NFC enabled devices, (iv) a trust token server interface 818 configured to enable mobile communication device 800 to communicate with a trust token server (for example, trust token server 314), and (v) a validation decision response controller 820 configured to control the functionality of mobile communication device 800 in response to receiving a merchant device validation decision message from a trust token server (for example, according to the teachings of method step 710 of FIG. 7).

The various components of mobile communication device 800 may be configured for implementing the mobile communication device functionality as described in connection with any of the methods of FIGS. 4 to 7 described above.

Figure 9:
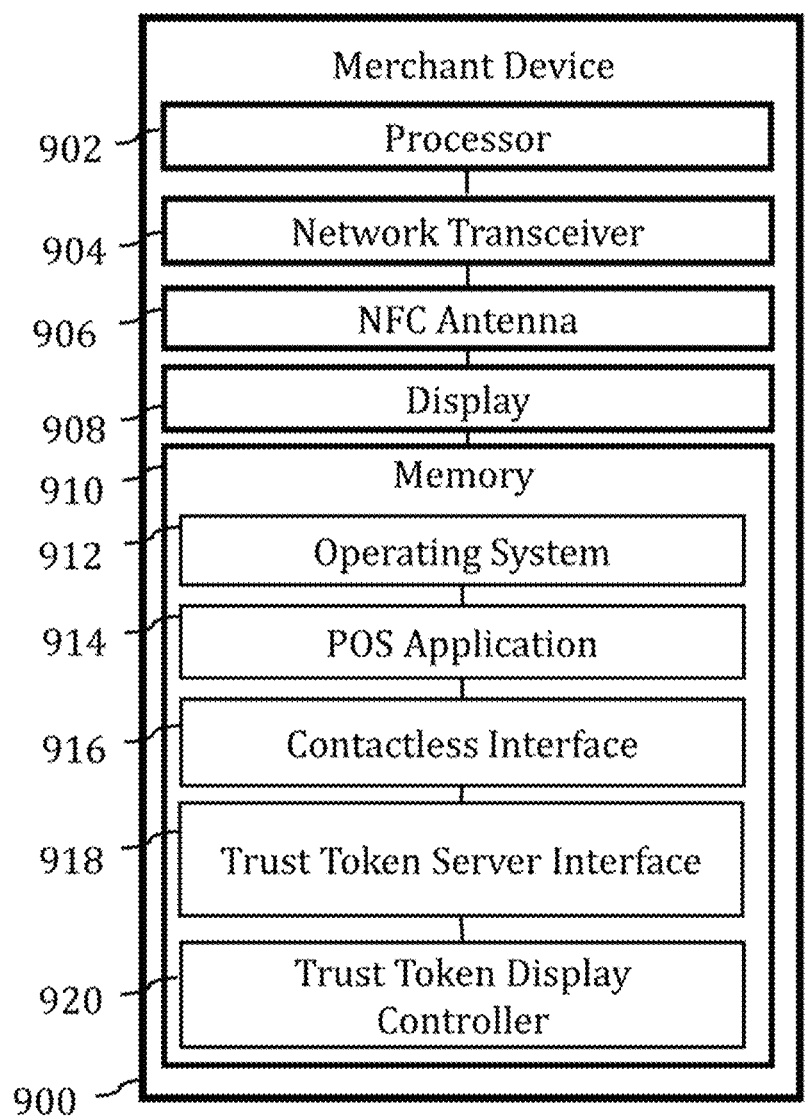
FIG. 9 illustrates an exemplary merchant device of a type that may be configured to implement the methods of the present invention.

FIG. 9 illustrates an exemplary merchant device 900 of a type that may be configured to implement the methods of the present invention (for example, for implementing the functionality of merchant device 304 as described above).

As shown in FIG. 9, merchant device 900 includes (i) a processor 902, (ii) a network transceiver 904 configured to enable transmission and receiving of network communications, (iii) a near field communication (NFC) antenna 906 configured to send and receive near-field-communication based data messages, (iv) a display 908 configured to enable merchant device 902 to display displayable trust tokens that have been received from a trust token server, and (v) a memory 910.

In an exemplary embodiment, memory 910 may have stored therewithin one or more of (i) an operating system 912 configured for managing device hardware and software resources and that provides common services for software programs implemented within merchant device 900, (ii) a point of sale (POS) application 914 configured for implementing POS terminal functionality through merchant device 900, (iii) a contactless interface 916 configured to implement contactless communication sessions between merchant device 900 and mobile communication device 800 or any other NFC enabled devices, (iv) a trust token server interface 918 configured to enable mobile communication device 800 to communicate with a trust token server (for example, trust token server 314), and (v) a trust token display controller 920 configured to enable merchant device 900 to render on a display device, one or more displayable trust tokens that are transmitted by a trust token server to merchant device 900.

The various components of merchant device 900 may be configured for implementing the merchant device functionality as described in connection with any of the methods of FIGS. 4 to 7 described above.

Figure 10:
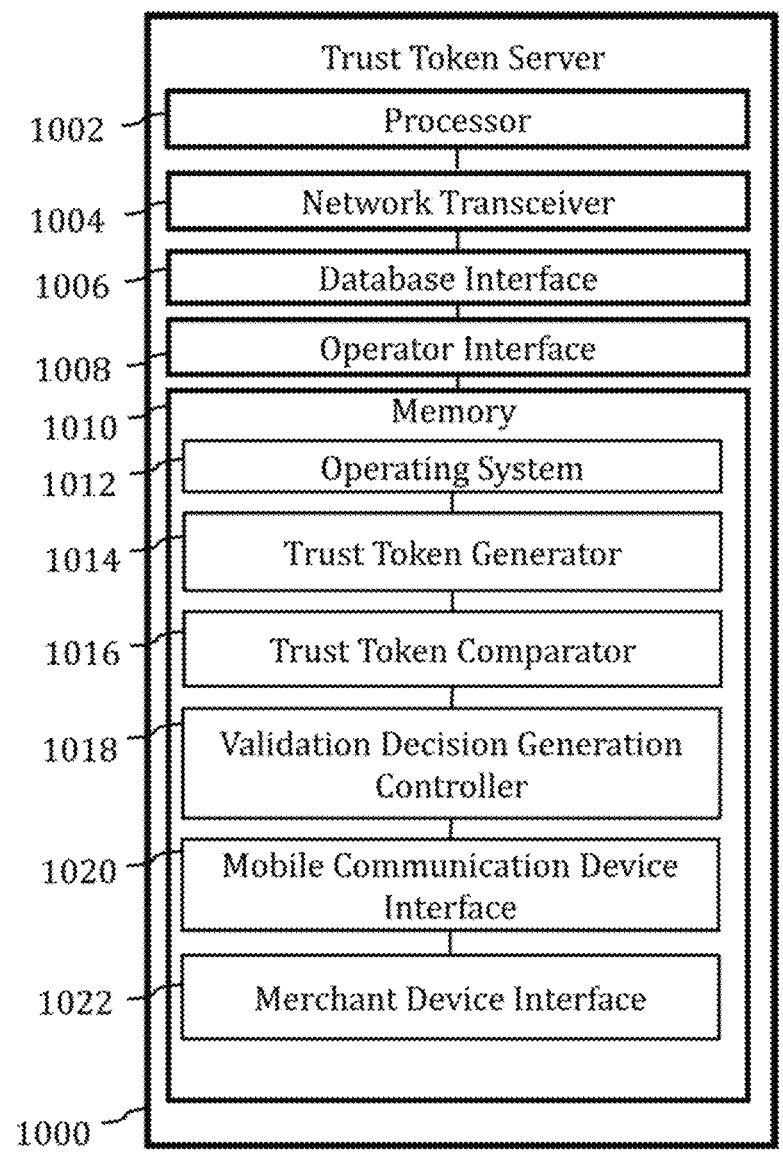
FIG. 10 illustrates an exemplary trust token server of a type that may be configured to implement the methods of the present invention.

FIG. 10 illustrates an exemplary trust token server 1000 of a type that may be configured to implement the methods of the present invention.

As shown in FIG. 10, trust token server 1000 includes (i) a processor 1002, (ii) a network transceiver 1004 configured to enable transmission and receiving of network communications, (iii) a database interface 1006 configured to enable trust token server 1000 to store data in and retrieve data from a database communicatively coupled therewith, (iv) an operator interface 1008 configured to enable an operator to configure or control trust token server 1000, and (v) a memory 1010.

In an exemplary embodiment, memory 1010 may have stored therewithin one or more of (i) an operating system 1012 configured for managing device hardware and software resources and that provides common services for software programs implemented within trust token server 1000, (ii) a trust token generator 1014 configured to generate displayable trust tokens in accordance with the teachings of FIG. 4 and/or FIG. 7, (iii) a trust token comparator 1016 configured to compare displayable tokens received from a mobile communication device against one or more displayable trust tokens previously generated by trust token server 1000, in accordance with the teachings of FIG. 4 and/or FIG. 7, (iv) a validation decision generation controller 1018 configured to generate validation decisions in accordance with the teachings of FIG. 4 and/or FIG. 7, (v) a mobile communication device interface 1020 configured to enable trust token server 1000 to communicate with one or more mobile communication devices, and (vi) a merchant device interface 1022 configured to enable trust token server 1000 to communicate with one or more merchant devices.

The various components of trust token server 1000 may be configured for implementing the functionality as described in connection with any of the methods of FIGS. 4 to 7 described above.

Figure 11:
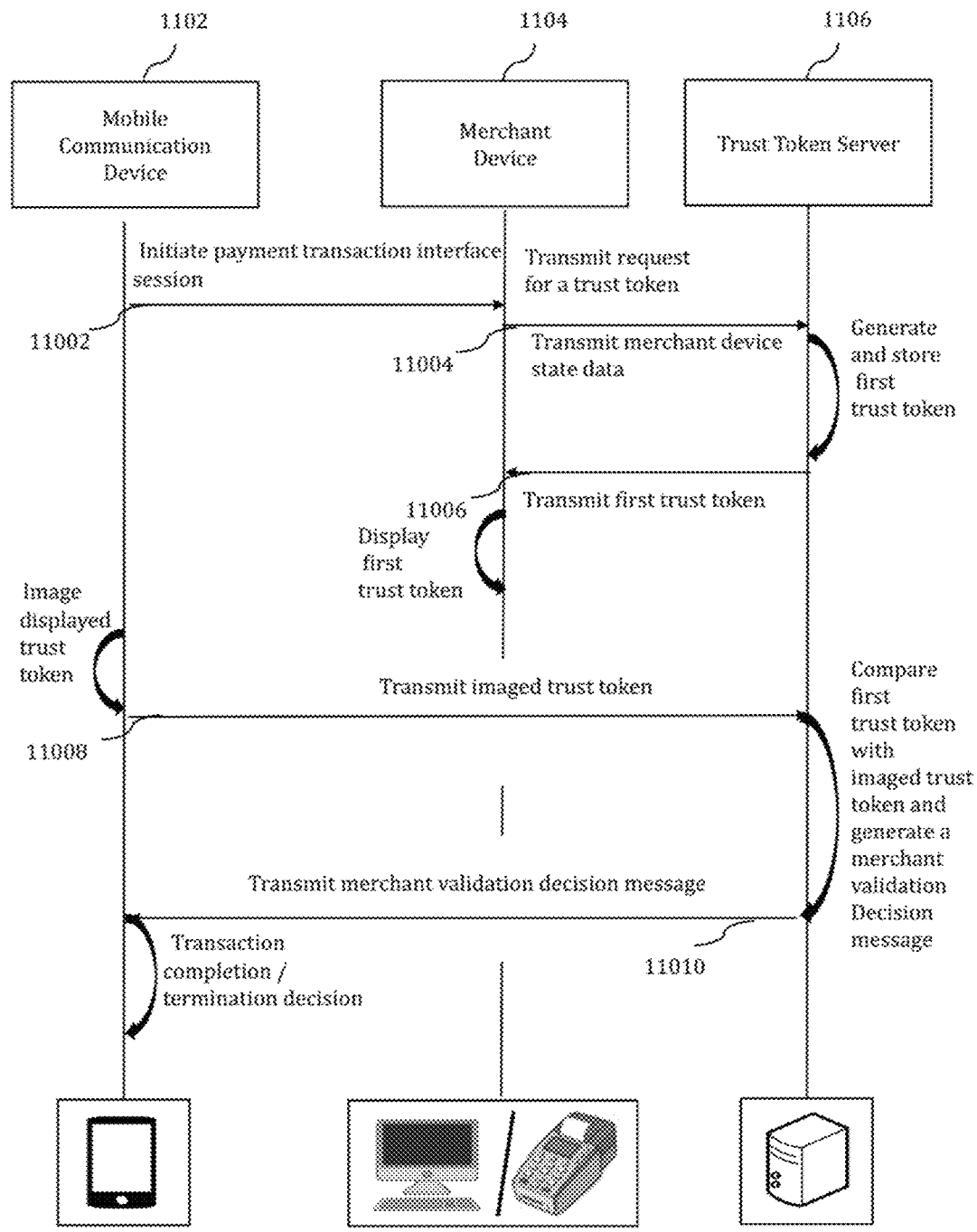
FIG. 11 is a communication flow diagram illustrating the communication flow between system entities for implementing the method of FIG. 4.

FIG. 11 is a communication flow diagram illustrating the communication flow between system entities for implementing the method of FIG. 4.

The communication flow of FIG. 11 commences at step 11002—which comprises initiating a payment transaction interface session between mobile communication device 1102 and merchant device 1104.

The payment transaction interface session may be initiated either by mobile communication device 1102 or by merchant device 1104, and comprises transmission of a request or instruction to initiate a contactless communication session for implementing an electronic payment transaction between mobile communication device 1102 and merchant device 1104. In an embodiment of the invention, the request or instruction to initiate a contactless communication session may be generated by mobile communication device 1102 and transmitted to merchant device 1104. In a further embodiment, the request or instruction transmitted by mobile communication device 1102 to merchant device 1104, may include a request for a trust token associated with merchant device 1104.

Step 11004 comprises transmitting to a trust token server 1106, a request for a trust token. The request for a trust token may be transmitted to trust token server 1106 by merchant device 1104. In an embodiment, merchant device 1104 generates and transmits the request for the trust token, to trust token server 1106(i) in response to initiation of a payment transaction interface session between mobile communication device 1102 and merchant device 1104, or (ii) in response to receiving a request for a trust token from mobile communication device 1102.

In an embodiment of step 11004, transmission of the request for a trust token is accompanied by transmission of merchant device data from merchant device 1104 to trust token server 1106. The merchant device data may include one or more of state data, historical data or parameter data corresponding to merchant device 1104. Exemplary instances of merchant device data that may be transmitted from merchant device 1104 to trust token server 1106 may include one or more of operating system data, device data, application integrity data and/or operating system reliability state data corresponding to merchant device 1104.

In an embodiment of method step 11004, a software application within merchant device 1104 may be configured to initiate a network communication session with trust token server 1106 for the purpose of requesting and receiving a trust token from trust token server 1106.

Trust token server 1106 assesses trustworthiness of merchant device 1104 and responds to a determination that merchant device 1104 is trustworthy, by generating and storing a first displayable trust token. The assessment of trustworthiness of merchant device 1104 may be implemented based on one or both of (i) the merchant device data received from merchant device 1104 and (ii) a set of trustworthiness assessment criteria or trustworthiness assessment rules or trustworthiness assessment models that are accessible by trust token server 1106.

The generated first displayable trust token may comprise any optically displayable and/or optically imageable token, including any of a pictogram, icon, picture, bar code, optical code, data matrix code, and/or quick-response (QR) code. The first displayable trust token may comprise a token that is encrypted using one or more encryption algorithms and/or encryption keys, for which the corresponding decryption algorithms and/or decryption keys are accessible to trust token server 1106 but not to either merchant device 1104 and/or mobile communication device 1102. In a further embodiment, the first displayable trust token comprises an encrypted set of data parameters associated uniquely with the first displayable trust token. In a yet further embodiment, the first displayable trust token is associated with a defined time-to-live duration. The first displayable trust token may also be associated with merchant device 1104 or with a unique merchant device identifier or merchant identifier associated with merchant device 1104. Any one or more of the data parameters associated uniquely with the first displayable trust token (including any associated defined time-to-live duration) may be stored within a database accessible by trust token server 1106 along with data or one or more associations linking such parameters with the displayable trust token.

Step 11006 comprises transmitting the generated first displayable trust token from trust token server 1006 to merchant device 1104—whereafter, the first displayable trust token is displayed on a display device by merchant device 1104.

The displayed first displayable trust token is imaged by mobile communication device 1102, and the imaged trust token (i.e. a second displayable trust token) is transmitted from mobile communication device 1102 to trust token server 1106 at step 11008.

Trust token server 1106 compares the imaged trust token received from mobile communication device 1102 with the first displayable trust token and generates a merchant validation decision message based on (i) the results of the comparison, and (ii) optionally on whether the imaged trust token has been received from mobile communication device 1102 within a time-to-live duration that is associated with said first displayable trust token in the records of trust token server 1106. At step 11010, the merchant validation decision message is transmitted from trust token server 1106 to mobile communication device 1102.

Mobile communication device 1102 implements a transaction completion/transaction termination decision based on the merchant device validation decision message received from trust token server 1106. More specifically, (i) responsive to the merchant device validation decision message comprising information representing merchant device 1104 as having been successfully validated, mobile communication device 1102 proceeds to implement the payment transaction through contactless communication between mobile communication device 1102 and merchant device 1104, or (ii) alternatively, responsive to the merchant device validation decision message comprising information representing merchant device 1104 as not having been successfully validated, mobile communication device 1102 terminates a contactless communication session between mobile communication device 1102 and merchant device 1104 without implementing the payment transaction or without transmitting payor account information to merchant device 1104.

Figure 12:
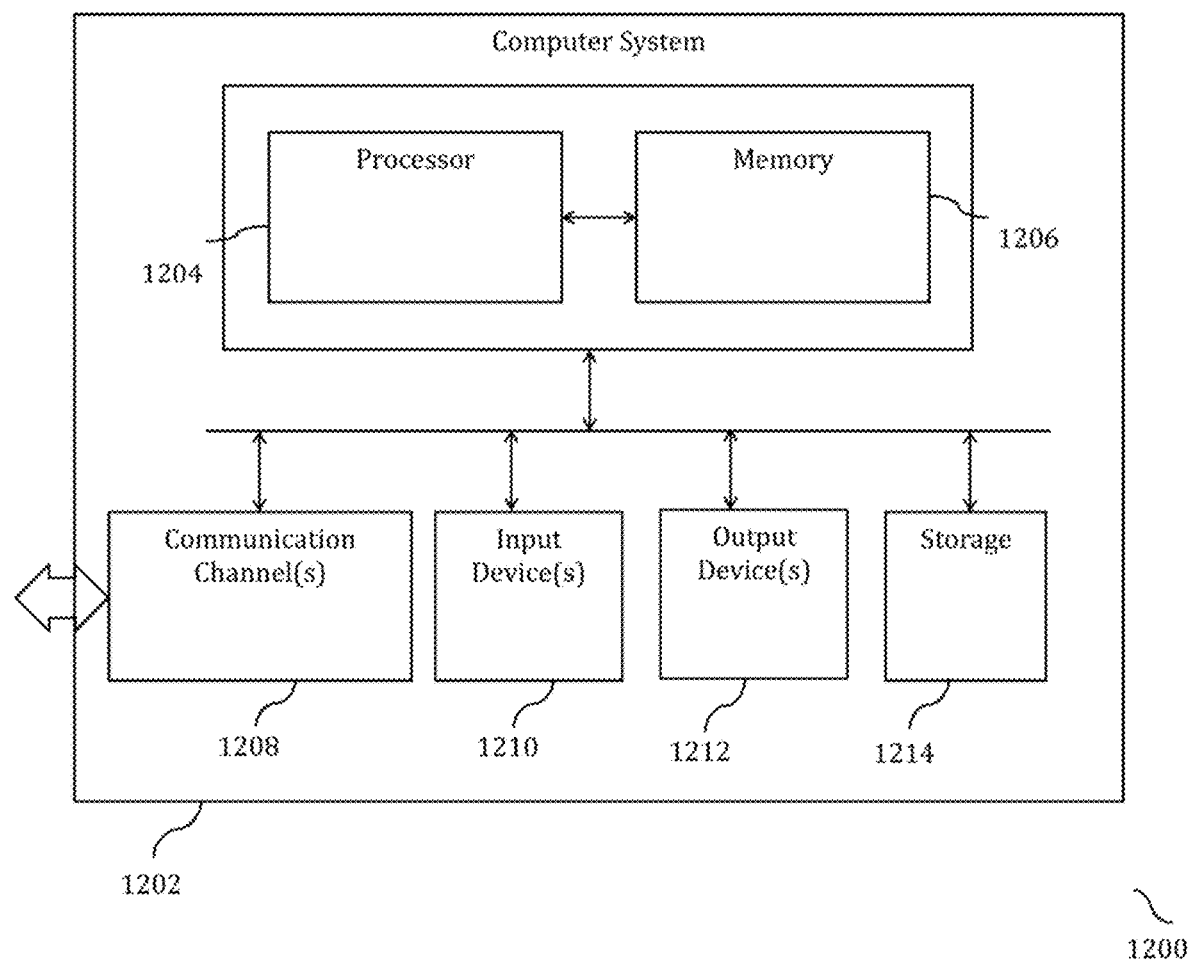
FIG. 12 illustrates an exemplary computer system according to which various embodiments of the present invention may be implemented.

FIG. 12 illustrates an exemplary computer system 1200 according to which various embodiments of the present invention may be implemented.

System 1200 includes computer system 1202 which in turn comprises one or more processors 1204 and at least one memory 1206. Processor 1204 is configured to execute program instructions—and may be a real processor or a virtual processor. It will be understood that computer system 1202 does not suggest any limitation as to scope of use or functionality of described embodiments. The computer system 1202 may include, but is not limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 1202 in accordance with the present invention may include one or more servers, desktops, laptops, tablets, smart phones, mobile phones, mobile communication devices, phablets and personal digital assistants. In an embodiment of the present invention, the memory 1206 may store software for implementing various embodiments of the present invention. The computer system 1202 may have additional components. For example, the computer system 1202 may include one or more communication channels 1208, one or more input devices 1210, one or more output devices 1212, and storage 1214. An interconnection mechanism (not shown) such as a bus, controller, or network, interconnects the components of the computer system 1202. In various embodiments of the present invention, operating system software (not shown) provides an operating environment for various softwares executing in the computer system 1202 using a processor 1204, and manages different functionalities of the components of the computer system 1202.

The communication channel(s) 1208 allow communication over a communication medium to various other computing entities. The communication medium provides information such as program instructions, or other data in a communication media. The communication media includes, but is not limited to, wired or contactless methodologies implemented with an electrical, optical, RF, infrared, acoustic, microwave, Bluetooth or other transmission media.

The input device(s) 1210 may include, but is not limited to, a touch screen, a keyboard, mouse, pen, joystick, trackball, a voice device, a scanning device, or any another device that is capable of providing input to the computer system 1202. In an embodiment of the present invention, the input device(s) 1210 may be a sound card or similar device that accepts audio input in analog or digital form. The output device(s) 1212 may include, but not be limited to, a user interface on CRT, LCD, LED display, or any other display associated with any of servers, desktops, laptops, tablets, smart phones, mobile phones, mobile communication devices, phablets and personal digital assistants, printer, speaker, CD/DVD writer, or any other device that provides output from the computer system 1202.

The storage 1214 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1202. In various embodiments of the present invention, the storage 1214 may contain program instructions for implementing any of the described embodiments.

In an embodiment of the present invention, the computer system 1202 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 1202. The method described herein is typically implemented as a computer program product, comprising a set of program instructions that is executed by the computer system 1202 or any other similar device. The set of program instructions may be a series of computer readable codes stored on a tangible medium, such as a computer readable storage medium (storage 1214), for example, diskette, CD-ROM, ROM, flash drives or hard disk, or transmittable to the computer system 1202, via a modem or other interface device, over either a tangible medium, including but not limited to optical or analogue communications channel(s) 1208. The implementation of the invention as a computer program product may be in an intangible form using contactless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

Based on the above, it would be understood that the present invention offers multiple advantages over a prior art solution, as it enables a payor or a payment application implemented within a payor device, to ascertain the security, reliability or trustworthiness of a merchant device, prior to transmission of payment card information or other confidential information to the merchant device in the course of a NFC enabled contactless payment transaction.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment that is specifically contemplated, the invention is intended to be practiced in the absence of any one or more element which are not specifically disclosed herein.

The invention claimed is:

1. A method for implementing an electronic payment transaction between a mobile communication device configured for implementing a defined communication protocol and a merchant device configured to implement the wireless communication protocol, whereby a trust token server ascertains the reliability of the merchant device prior to transmission of payment information from the mobile communication device, the method being implemented by a processor of the trust token server, comprising:
   receiving from the merchant device a request for a trust token, wherein the request is originated by the mobile communication device through a contactless communication channel for the electronic payment transaction between the merchant device and the mobile communication device;
   determining whether the merchant device is trustworthy, wherein said determination is based on merchant device data associated with the merchant device;
   responsive to a determination that the merchant device is trustworthy, generating a first displayable trust token, wherein the first displayable trust token comprises a token that is encrypted using one or more encryption algorithms or encryption keys, wherein the one or more decryption algorithms or decryption keys corresponding to the first displayable trust token are accessible exclusively to the trust token server;
   storing a copy of the first displayable trust token in a database coupled with the trust token server;
   transmitting the first displayable trust token to the merchant device through a first network communication channel that is different from the contactless communication channel;
   receiving a second displayable trust token from the mobile communication device, wherein the second displayable trust token has been imaged by the mobile communication device from a display coupled with the merchant device;
   decrypting the copy of the first displayable trust token and the second displayable trust token using the one or more encryption algorithms or encryption keys to extract information associated with each displayable trust token;
   comparing information extracted from the second displayable trust token against information extracted from the copy of the first displayable trust token;
   generating a merchant device validation decision message based on the comparison, wherein:
      the merchant device validation decision message comprises an indication that the merchant device has been validated as being trustworthy, in response to the comparison resulting in a match decision; and
      the merchant device validation decision message comprises an indication that the merchant device has not been validated as being trustworthy, in response to the comparison resulting in a non-match decision; and
   transmitting the merchant validation decision message to the mobile communication device through a second network communication channel that is different from the first network communication channel, wherein the trust token server is different from the merchant device and the mobile communication device.

2. The method as claimed in claim 1 wherein the defined communication protocol is a near-field-communication (NFC) protocol.

3. The method as claimed in claim 1, wherein:
   responsive to the merchant device validation decision message comprising an indication that the merchant device has been validated, the mobile communication device proceeds to implement a payment transaction through contactless communication between the mobile communication device and the merchant device; and
   responsive to the merchant device validation decision message comprising an indication that the merchant device has not been validated, the mobile communication device terminates the contactless communication session between the mobile communication device and the merchant device prior to:
      implementing the payment transaction, or
      transmitting payor account information to the merchant device.

4. The method of claim 1, wherein the first displayable trust token is generated and encrypted to include a set of data parameters associated uniquely with the first displayable trust token.

5. The method of claim 1, wherein:
   the first displayable trust token is associated with a defined time-to-live duration; and
   generation of the merchant device validation message is based on determining whether the second displayable trust token is received from the mobile communication device within a time-to-live duration that is associated with the first displayable trust token.

6. A system for implementing an electronic payment transaction between a mobile communication device configured for implementing a defined communication protocol and a merchant device configured to implement the wireless communication protocol, whereby a trust token server ascertains the reliability of the merchant device prior to transmission of payment information from the mobile communication device, wherein the system comprises:
   the trust token server comprising a processor and a memory, wherein the processor is configured to:
      receive from the merchant device, a request for a trust token, wherein the request is originated by the mobile communication device through a contactless communication channel for the electronic payment transaction between the merchant device and the mobile communication device;

determine whether the merchant device is trustworthy, wherein said determination is based on merchant device data associated with the merchant device;

responsive to a determination that the merchant device is trustworthy, generate a first displayable trust token, wherein the first displayable trust token comprises a token that is encrypted using one or more encryption algorithms or encryption keys, wherein decryption algorithms or decryption keys corresponding to the first displayable trust token are accessible exclusively to the trust token server;

store a copy of the first displayable trust token in a database coupled with the trust token server;

transmit the first displayable trust token to the merchant device through a first network communication channel that is different from the contactless communication channel;

receive a second displayable trust token from the mobile communication device, wherein the second displayable trust token has been imaged by the mobile communication device from a display coupled with the merchant device;

decrypt the copy of the first displayable trust token and the second displayable trust token using the one or more encryption algorithms or encryption keys to extract information associated with each displayable trust token;

compare information extracted from the second displayable trust token against information extracted from the copy of the first displayable trust token;

generate a merchant device validation decision message based on the comparison, wherein:
the merchant device validation decision message comprises an indication that the merchant device has been validated as being trustworthy, in response to the comparison resulting in a match decision; and
the merchant device validation decision message comprises an indication that the merchant device has not been validated as being trustworthy, in response to the comparison resulting in a non-match decision; and transmit the merchant validation decision message to the mobile communication device through a second network communication channel that is different from the first network communication channel, wherein the trust token server is different from the merchant device and the mobile communication device.

7. The system as claimed in claim 6 wherein the defined communication protocol is a near-field-communication (NFC) protocol.

8. The system as claimed in claim 6, wherein:
responsive to the merchant device validation decision message comprising information representing the merchant device as being validated, the mobile communication device proceeds to implement a payment transaction through contactless communication between the mobile communication device and the merchant device; and
responsive to the merchant device validation decision message comprising information representing the merchant device as not being validated, the mobile communication device terminates the contactless communication session between the mobile communication device and the merchant device, prior to:
implementing the payment transaction, or
transmitting payor account information to the merchant device.

9. The system as claimed in claim 6, wherein the merchant device data includes any one or more of state data, historical data, parameter data, operating system data, device data, application integrity data, and operating system reliability state data corresponding to the merchant device.

10. The system as claimed in claim 6, wherein one or both of the first displayable trust token and the second displayable trust token comprise any of an optically displayable token, an optically imageable token, a pictogram, icon, image, bar code, optical code, data matrix code, or a quick-response (QR) code.

11. The system as claimed in claim 6, wherein the first displayable trust token is generated and encrypted to include a set of data parameters associated uniquely with the first displayable trust token.

12. The system as claimed in claim 6, wherein:
the first displayable trust token is associated with a defined time-to-live duration; and
generation of the merchant device validation message is based on determining whether the second displayable trust token is received from the mobile communication device within a time-to-live duration that is associated with the first displayable trust token.

13. A non-transitory computer readable medium for implementing an electronic payment transaction between a mobile communication device configured for implementing a defined communication protocol and a merchant device configured to implement the wireless communication protocol, whereby a trust token server ascertains the reliability of the merchant device prior to transmission of payment information from the mobile communication device, the non-transitory computer readable medium having a computer readable program code embodied therein, the computer readable program code comprising instructions for:

receiving from the merchant device a request for a trust token, wherein the request is originated by the mobile communication device through a contactless communication channel for the electronic payment transaction between the merchant device and the mobile communication device;

determining whether the merchant device is trustworthy, wherein said determination is based on merchant device data associated with the merchant device;

responsive to a determination that the merchant device is trustworthy, generating a first displayable trust token, wherein the first displayable trust token comprises a token that is encrypted using one or more encryption algorithms or encryption keys, wherein decryption algorithms or decryption keys corresponding to the first displayable trust token are accessible exclusively to the trust token server;

storing a copy of the first displayable trust token in a database coupled with the trust token server;

transmitting the first displayable trust token to the merchant device through a first network communication channel that is different from the contactless communication channel;

receiving a second displayable trust token from the mobile communication device, wherein the second displayable trust token has been imaged by the mobile communication device from a display coupled with the merchant device;

decrypting the copy of the first displayable trust token and the second displayable trust token using the one or more encryption algorithms or encryption keys to extract information associated with each displayable trust token;

comparing information extracted from the second displayable trust token against information extracted from the copy of the first displayable trust token;

generating a merchant device validation decision message based on the comparison, wherein:

the merchant device validation decision message comprises an indication that the merchant device has been validated as being trustworthy, in response to the comparison resulting in a match decision; and the merchant device validation decision message comprises an indication that the merchant device has not been validated as being trustworthy, in response to the comparison resulting in a non-match decision; and transmitting the merchant validation decision message to the mobile communication device through a second network communication channel that is different from the first network communication channel, wherein the trust token server is different from the merchant device and the mobile communication device.

14. The non-transitory computer readable medium of claim 13, wherein the defined communication protocol is a near-field-communication (NFC) protocol.

15. The non-transitory computer readable medium of claim 13, wherein:

responsive to the merchant device validation decision message comprising an indication that the merchant device has been validated, the mobile communication device proceeds to implement a payment transaction through contactless communication between the mobile communication device and the merchant device; and responsive to the merchant device validation decision message comprising an indication that the merchant device has not been validated, the mobile communication device terminates the contactless communication session between the mobile communication device and the merchant device prior to:

implementing the payment transaction, or transmitting payor account information to the merchant device.

16. The non-transitory computer readable medium of claim 13, wherein:

the first displayable trust token is associated with a defined time-to-live duration; and generation of the merchant device validation message is based on determining whether the second displayable trust token is received from the mobile communication device within a time-to-live duration that is associated with the first displayable trust token.

17. The method of claim 1, wherein the merchant device data includes any one or more of state data, historical data, parameter data, operating system data, device data, application integrity data, and operating system reliability state data corresponding to the merchant device.

18. The method of claim 1, wherein one or both of the first displayable trust token and the second displayable trust token comprise any of an optically displayable token, an optically imageable token, a pictogram, icon, image, bar code, optical code, data matrix code, or a quick-response (QR) code.

* * * * *